(12) United States Patent
Uehara et al.

(10) Patent No.: US 9,692,085 B2
(45) Date of Patent: Jun. 27, 2017

(54) LITHIUM ION SECONDARY BATTERY

(71) Applicant: NEC Corporation, Tokyo (JP)

(72) Inventors: Makiko Uehara, Tokyo (JP); Takehiro Noguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 256 days.

(21) Appl. No.: 14/356,710

(22) PCT Filed: Oct. 26, 2012

(86) PCT No.: PCT/JP2012/077686
§ 371 (c)(1),
(2) Date: May 7, 2014

(87) PCT Pub. No.: WO2013/069474
PCT Pub. Date: May 16, 2013

(65) Prior Publication Data
US 2014/0322615 A1 Oct. 30, 2014

(30) Foreign Application Priority Data
Nov. 10, 2011 (JP) ................. 2011-246510

(51) Int. Cl.
H01M 10/0569 (2010.01)
H01M 4/505 (2010.01)
H01M 4/525 (2010.01)
H01M 10/0525 (2010.01)
H01M 4/58 (2010.01)
H01M 2/16 (2006.01)

(52) U.S. Cl.
CPC ..... *H01M 10/0569* (2013.01); *H01M 2/1626* (2013.01); *H01M 4/505* (2013.01); *H01M 4/525* (2013.01); *H01M 10/0525* (2013.01); *H01M 2/1613* (2013.01); *H01M 4/5825* (2013.01); *Y02E 60/122* (2013.01); *Y02T 10/7011* (2013.01)

(58) Field of Classification Search
CPC ......... H01M 10/0569; H01M 10/0525; H01M 4/505; H01M 4/525; H01M 4/5825; H01M 2/1626; H01M 2/1613; Y02E 60/122
See application file for complete search history.

(56) References Cited

U.S. PATENT DOCUMENTS

| | | | |
|---|---|---|---|
| 2006/0124973 A1 | 6/2006 | Arai et al. | |
| 2008/0026297 A1* | 1/2008 | Chen | H01M 10/052 429/341 |
| 2008/0241660 A1 | 10/2008 | Ogawa et al. | |
| 2010/0040954 A1* | 2/2010 | Amine | H01M 10/0565 429/322 |
| 2011/0020712 A1 | 1/2011 | Angell et al. | |
| 2011/0076572 A1 | 3/2011 | Amine et al. | |

FOREIGN PATENT DOCUMENTS

| | | |
|---|---|---|
| CN | 101904041 A | 12/2010 |
| CN | 103493276 A | 1/2014 |
| EP | 2 228 863 A1 | 9/2010 |
| EP | 2 698 855 A1 | 2/2014 |
| JP | 2001-006747 | 1/2001 |
| JP | 2001-273880 | 10/2001 |
| JP | 2003-288946 | 10/2003 |
| JP | 3466045 | 11/2003 |
| JP | 2007-287677 | 11/2007 |
| JP | 2008-234851 | 10/2008 |
| JP | 2008-243482 | 10/2008 |
| JP | 2009-211822 | 9/2009 |
| JP | 4445537 | 4/2010 |
| JP | 2011-082033 | 4/2011 |
| JP | 2011-096462 | 5/2011 |
| JP | 2011-198637 | 10/2011 |
| JP | 2012-064572 | 3/2012 |
| JP | 2013-98034 | 5/2013 |
| WO | WO 2009/133899 A1 | 11/2009 |
| WO | WO 2011/049184 A1 | 4/2011 |

(Continued)

OTHER PUBLICATIONS

Extended European Search Report mailed on Jun. 16, 2015 by the European Patent Office in counterpart European Patent Application No. 12847804.7.
International Search Report mailed Dec. 11, 2012.
Office Action issued by the Chinese Patent Office in counterpart Chinese Patent Application No. 201280055192.5, dated Sep. 6, 2015.
K. Ariyoshi et al., "Lithium Aluminum Manganese Oxide Having Spinel-Framework Structure for Long-Life Lithium-Ion Batteries", Electrochemical and Solid-State Letters, vol. 9, pp. A557-A560, Oct. 2006.

(Continued)

*Primary Examiner* — Laura Weiner
(74) *Attorney, Agent, or Firm* — Finnegan, Henderson, Farabow, Garrett & Dunner LLP

(57) ABSTRACT

It is an object of this exemplary embodiment to provide a lithium ion secondary battery using a positive electrode active material having an operating potential of 4.5 V or more, the lithium ion secondary battery having excellent high temperature cycle characteristics. This exemplary embodiment is a lithium ion secondary battery comprising a positive electrode and a negative electrode capable of intercalating and deintercalating lithium, a separator between the positive electrode and the negative electrode, and an electrolytic solution containing a nonaqueous electrolytic solvent, wherein the positive electrode comprises a positive electrode active material operating at a potential of 4.5 V or more versus lithium, the separator comprises cellulose, a cellulose derivative, or a glass fiber, and the nonaqueous electrolytic solvent comprises a fluorinated solvent.

5 Claims, 1 Drawing Sheet

(56) References Cited

FOREIGN PATENT DOCUMENTS

WO     WO 2012/141301     * 10/2012
WO     WO 2012/141301 A1    10/2012

OTHER PUBLICATIONS

T. Ohzuku et al., "Solid-state redox potentials for Li[Me$_{1/2}$Mn$_{3/2}$]O$_4$ (Me: 3d-transition metal) having spinel-framework structures: a series of 5 volt materials for advanced lithium-ion batteries", Journal of Power Sources, vol. 81-82, pp. 90-94, 1999.
Office Action mailed on Oct. 4, 2016. by the Japanese Patent Office in counterpart Japanese Patent Application No. 2013-542922.

* cited by examiner

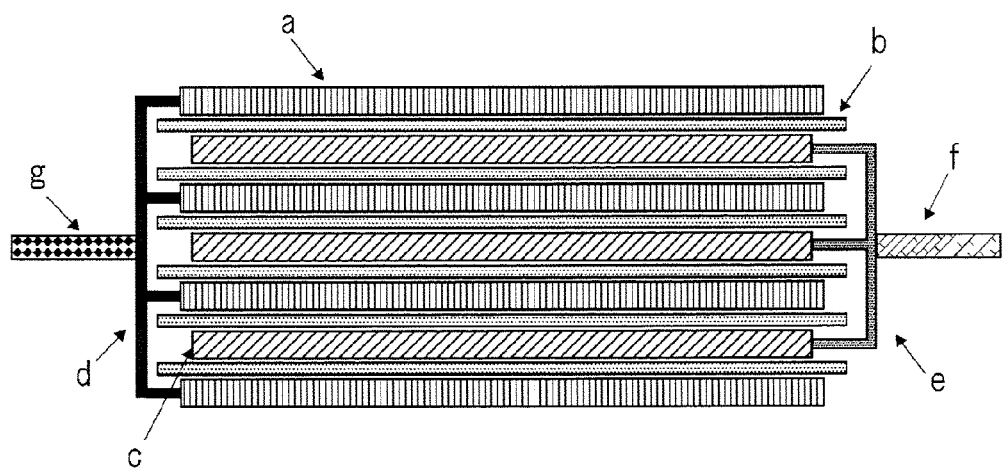

LITHIUM ION SECONDARY BATTERY

CROSS-REFERENCE TO RELATED PATENT APPLICATIONS

This application is a National Stage Entry of International Application No. PCT/JP2012/077686, filed Oct. 26, 2012, which claims priority from Japanese Patent Application No. 2011-246510, filed Nov. 10, 2011. The entire contents of the above-referenced applications are expressly incorporated herein by reference.

TECHNICAL FIELD

This exemplary embodiment relates to a secondary battery.

BACKGROUND ART

Lithium ion secondary batteries using electrolytic solutions have higher operating potential, smaller size, and higher energy density than aqueous solution-based secondary batteries and therefore are widely used as power supplies for cellular phones, notebook computers, and the like. But, as rapid development of portable electronic equipment and use in electric cars have been achieved in recent years, a further improvement in energy density has been required.

Examples of methods for improving energy density include a method using an active material having large capacity, a method of increasing the operating potential of a battery, and methods of improving charge and discharge efficiency, cycle life, and the like. Among these, the method of increasing the operating potential of a battery can provide an assembled battery having a smaller number of series than a conventional assembled battery and therefore is means effective for the size reduction and weight reduction of a battery module used in an electric car or the like.

As the positive electrode active materials of lithium ion secondary batteries, 4 V class active materials (average operating potential=3.6 to 3.8 V: versus lithium potential) such as lithium cobaltate and lithium manganate are known. On the other hand, for example, it is known that compounds obtained by replacing the Mn of spinel type lithium manganate by Ni, Co, Fe, Cu, Cr, or the like can be used as 5 V class active materials. These compounds have an average operating potential of 4.6 V or more versus lithium potential.

For example, $LiNi_{0.5}Mn_{1.5}O_4$ has a capacity of 130 mAh/g or more and an average operating potential of 4.6 V or more versus Li metal. Therefore, it is expected as a material having high energy density. Further, spinel type lithium manganese oxides have advantages such as comprising a three-dimensional lithium diffusion path, having better thermodynamic stability than other compounds, and being easily synthesized.

In addition, polyolefin microporous films typified by polyethylene and polypropylene are widely used in lithium ion secondary batteries. In the polyolefin microporous film, when about 120 to 170° C. is reached, a shutdown function in which the separator melts to close the pores of the separator to stop the battery function is exhibited, and the safety of the battery is maintained.

As an example of a separator using a polyolefin microporous film, Patent Literature 1 discloses disposing a microporous film layer made of polypropylene on the surface of a separator opposed to a positive electrode.

Patent Literature 2 discloses a separator provided with a layer comprising at least one material from polypropylene, a polyaramid, a polyamideimide, and a polyimide.

Patent Literature 3 discloses a separator in which a fibrous flame-retardant compound such as glass fibers and aramid fibers is dispersed in a polyolefinic resin in order to improve the thermal stability of the separator.

In addition, separators containing cellulose such as paper and nonwoven fabrics are also used. Separators comprising cellulose and separators comprising glass fibers have excellent heat resistance and high load characteristics.

For example, Patent Literature 4 discloses a separator comprising cellulose fibers in a lithium ion secondary battery by defining the porosity, pore diameter, and pore specific surface area of the separator.

In Patent Literature 5, a cellulose separator is used by using, as a positive electrode active material, a spinel-based manganese complex metal oxide having an about 130° C. higher oxygen release temperature than a lithium cobalt complex metal oxide and a low need for a shutdown function.

Patent Literature 6 discloses a lithium ion secondary battery using a separator comprising glass fibers.

CITATION LIST

Patent Literature

Patent Literature 1: JP2001-273880A
Patent Literature 2: JP2008-234851A
Patent Literature 3: JP2008-243482A
Patent Literature 4: JP4445537B
Patent Literature 5: JP2001-006747A
Patent Literature 6: JP3466045B

SUMMARY OF INVENTION

Technical Problem

However, when a positive electrode active material having high operating potential such as a 5 V class active material is used, various materials constituting a lithium ion secondary battery are exposed to high potential during charge, and therefore, a problem such as decomposition or change in quality may occur. For example, a problem may occur in which the electrolytic solution decomposes in the contact portion between the positive electrode and the electrolytic solution to generate a gas, the decomposition products are deposited on the separator, and the like, and thus, the charge and discharge cycle characteristics decrease. In particular, at a high temperature such as 45° C. or more, such a problem becomes serious. Further, in a separator made of polyethylene, when the charge termination voltage is more than 4.2 V, a problem may also occur in which the separator is oxidized and deteriorates, and a gas due to the oxidation is generated.

As described above, separators comprising cellulose and glass fibers have excellent heat resistance and high load characteristics. But, in a lithium ion secondary battery using a 5 V class active material, deterioration due to the oxidative decomposition of the separator occurs, causing a decrease in capacity retention rate.

Accordingly, it is an object of this exemplary embodiment to provide a lithium ion secondary battery using a positive electrode active material having an operating potential of 4.5

V or more, the lithium ion secondary battery having excellent high temperature cycle characteristics.

Solution to Problem

This exemplary embodiment is a lithium ion secondary battery comprising a positive electrode and a negative electrode capable of intercalating and deintercalating lithium, a separator between the positive electrode and the negative electrode, and an electrolytic solution containing a nonaqueous electrolytic solvent, wherein the positive electrode comprises a positive electrode active material operating at a potential of 4.5 V or more versus lithium, the separator comprises cellulose, a cellulose derivative, or a glass fiber, and the nonaqueous electrolytic solvent comprises a fluorinated solvent.

Advantageous Effect of Invention

This exemplary embodiment can provide a lithium ion secondary battery using a positive electrode active material having an operating potential of 4.5 V or more, the lithium ion secondary battery having excellent high temperature cycle characteristics.

BRIEF DESCRIPTION OF DRAWING

FIG. 1 is a cross-sectional view showing an example of the configuration of a secondary battery according to this exemplary embodiment.

DESCRIPTION OF EMBODIMENT

This exemplary embodiment relates to a nonaqueous electrolyte secondary battery comprising a positive electrode and a negative electrode capable of intercalating and deintercalating lithium, a separator between the above positive electrode and the above negative electrode, and an electrolytic solution containing lithium ions. The components in this exemplary embodiment will be described below.

[1] Separator

The separator in this exemplary embodiment comprises cellulose, a cellulose derivative, or a glass fiber.

(Cellulose-Containing Separator)

A secondary battery in one aspect of this exemplary embodiment comprises a cellulose-containing separator containing cellulose.

The cellulose-containing separator is not particularly limited, and can be used without particular problems as long as it is a separator comprising cellulose. For example, known separators containing cellulose can be used. Specific examples thereof include cellulose paper.

The cellulose-containing separator preferably comprises cellulose fibers as a main component. Preferably 30% by mass or more, more preferably 50% by mass or more, further preferably 70% or more, and particularly preferably 90% or more, of cellulose fibers in the constituent materials of the separator are included.

In addition, the cellulose-containing separator may be a nonwoven fabric made comprising a material other than cellulose in order to increase strength as long as cellulose fibers are included. Examples of the material other than cellulose include resin materials, such as polypropylenes, polyethylenes, polyethylene terephthalates (PET), polytetrafluoroethylenes, polyvinylidene fluorides, polyimides, and polyamideimides. In addition, cellulose paper having one surface or both surfaces chemically modified with these materials or physically modified with these materials by spin coating or the like may be used. In addition, cellulose paper having a surface coated with aluminum oxide or physically coated with aluminum oxide by spin coating or the like may be used.

In addition, as the cellulose-containing separator, cellulose paper on which a material in the form of a film or paper comprising a resin material, such as polyethylene, polypropylene, polyethylene terephthalate, polytetrafluoroethylene, polyvinylidene fluoride, a polyimide, or a polyamideimide, is laminated can also be used.

In addition, the cellulose-containing separator preferably comprises 30% by mass or more, more preferably 50% by mass or more, and further preferably 70% by mass or more of the cellulose component in the constituent materials from the viewpoint of maintaining strength during immersion in the electrolytic solution and suppressing an internal short circuit in the battery. In addition, the cellulose-containing separator is particularly preferably a nonwoven fabric comprising 70% by mass or more of a cellulose component.

The porosity of the cellulose-containing separator is preferably 50% or more and 95% or less. When the porosity is 50% or more, the situation in which the accumulation of side reaction products inhibits the movement of ions is suppressed, and the capacity retention rate can be more effectively improved. When the porosity is 95% or less, the occurrence of an internal short circuit is more effectively suppressed. The porosity can be obtained, for example, from the true density and total volume of materials that are the raw materials of the microporous film, and the weight and volume of the microporous film.

The thickness of the cellulose-containing separator is not particularly limited, and is preferably 10 µm or more and 200 µm or less, more preferably 15 µm or more and 100 µm or less, and further preferably 20 µm or more and 50 µm or less when one sheet is used alone. When the thickness is 10 µm or more, the strength in the film thickness direction is improved, and the rate of occurrence of an internal short circuit is more effectively suppressed. When the thickness is 200 µm or less, an increase in internal resistance and a decrease in discharge capacity are more effectively suppressed. When a separator is provided by lamination with other films, each thickness should be appropriately determined taking into consideration the total thickness of the film formed by lamination.

(Cellulose Derivative-Containing Separator)

A secondary battery in one aspect of this exemplary embodiment comprises a cellulose derivative-containing separator containing a cellulose derivative.

The cellulose derivative-containing separator is not particularly limited, and can be used without particular problems as long as it is a separator comprising a cellulose derivative.

The cellulose derivative is represented, for example, by the following formula (1).

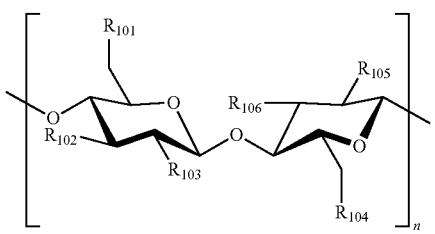
(1)

wherein $R_{101}$ to $R_{106}$ each independently represent a hydroxy group, a phosphoric acid residue, or a phosphorous acid residue, and at least one of $R_{101}$ to $R_{106}$ is a phosphoric acid residue or a phosphorous acid residue; and n is an integer of 2 or more, and $R_{101}$ to $R_{106}$ are each independent for each n.

In formula (1), the phosphoric acid residue is represented by the following formula (2).

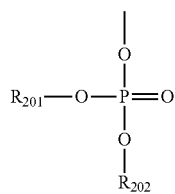
(2)

wherein $R_{201}$ and $R_{202}$ each independently represent a hydrogen atom, a substituted or unsubstituted alkyl group, or a substituted or unsubstituted aryl group.

In addition, in formula (1), the phosphorous acid residue is represented by the following formula (3).

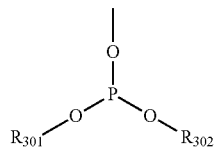
(3)

wherein $R_{301}$ and $R_{302}$ each independently represent a hydrogen atom, a substituted or unsubstituted alkyl group, or a substituted or unsubstituted aryl group.

In formulas (2) and (3), the alkyl group is preferably an alkyl group having 1 to 8 carbon atoms in total, more preferably an alkyl group having 1 to 6 carbon atoms in total, and further preferably an alkyl group having 1 to 4 carbon atoms in total. In addition, the alkyl group includes a linear alkyl group, a branched alkyl group, or a cyclic alkyl group.

In formulas (2) and (3), the aryl group is preferably an aryl group having 6 to 18 carbon atoms in total, more preferably an aryl group having 6 to 12 carbon atoms in total, and further preferably an aryl group having 6 to 10 carbon atoms in total.

In formulas (2) and (3), examples of the substituent of the alkyl group or the aryl group include halogen atoms, preferably a fluorine atom.

In addition, in formula (2), a cyclic structure may be formed by a carbon-carbon bond between $R_{201}$ and $R_{202}$. Also in formula (3), similarly, a cyclic structure may be formed by a carbon-carbon bond between $R_{301}$ and $R_{302}$.

In formula (2), $R_{201}$ and $R_{202}$ and $R_{301}$ and $R_{302}$ are preferably alkyl groups from the viewpoint of suppressing an increase in irreversible capacity.

The cellulose derivative-containing separator can be formed, for example, by carding fibers of phosphated cellulose by the so-called paper making method. In addition, the cellulose derivative-containing separator can also be formed, for example, by making fibers of phosphated cellulose into a woven fabric. In addition, the cellulose derivative-containing separator can also be obtained, for example, by subjecting the above-described cellulose-containing separator to phosphating treatment or phosphiting treatment. In this case, it is desired to remove, before or during the phosphating treatment, a binder, such as polyethylenimine, sodium alginate, or polyacrylamide, that may be used in manufacturing the cellulose paper.

The thickness of the cellulose derivative-containing separator is not particularly limited, and is preferably 10 μm or more and 200 μm or less, more preferably 15 μm or more and 100 μm or less, and further preferably 20 μm or more and 50 μm or less when one sheet is used alone. When the thickness is 10 μm or more, the strength in the film thickness direction is improved, and the rate of occurrence of an internal short circuit is more effectively suppressed. When the thickness is 200 μm or less, an increase in internal resistance and a decrease in discharge capacity are more effectively suppressed. When a separator is provided by lamination with other films, each thickness should be appropriately determined considering the total thickness of the film formed by lamination.

The porosity of the cellulose derivative-containing separator is preferably 50% or more and 95% or less. When the porosity is 50% or more, the situation in which the accumulation of side reaction products inhibits the movement of ions is suppressed, and the capacity retention rate can be more effectively improved. When the porosity is 95% or less, the occurrence of an internal short circuit is more effectively suppressed. The porosity can be obtained, for example, from the true density and total volume of materials that are the raw materials of the microporous film, and the weight and volume of the microporous film.

The cellulose derivative-containing separator can be obtained by replacing at least one of the hydroxy groups on the surface of the cellulose in the cellulose-containing separator by phosphoric acid residues or phosphorous acid residues as described above.

The cellulose derivative-containing separator can be obtained by bringing a cellulose-containing separator comprising cellulose as a main component into contact with a solution comprising a phosphate or a phosphite and water. In addition, the cellulose derivative-containing separator can be preferably obtained by heat-treating a cellulose-containing separator comprising cellulose as a main component in a state in which it is brought into contact with a solution comprising a phosphate or a phosphite and water.

In this exemplary embodiment, the phosphate is represented by formula (4).

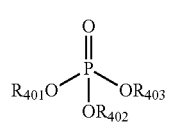
(4)

wherein $R_{401}$ to $R_{403}$ each independently represent a hydrogen atom, a substituted or unsubstituted alkyl group, or a substituted or unsubstituted aryl group, and any one of $R_{401}$ to $R_{403}$ is a substituted or unsubstituted alkyl group or a substituted or unsubstituted aryl group.

In this exemplary embodiment, the phosphite is represented by formula (5).

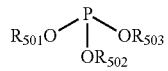
(5)

wherein $R_{501}$ to $R_{503}$ each independently represent a hydrogen atom, a substituted or unsubstituted alkyl group, or a substituted or unsubstituted aryl group, and any one of $R_{501}$ to $R_{503}$ is a substituted or unsubstituted alkyl group or a substituted or unsubstituted aryl group.

In formulas (4) and (5), the alkyl group is preferably an alkyl group having 1 to 8 carbon atoms, more preferably an alkyl group having 1 to 6 carbon atoms, and further preferably an alkyl group having 1 to 4 carbon atoms. In addition, the alkyl group includes a linear alkyl group, a branched alkyl group, or a cyclic alkyl group.

In formulas (4) and (5), the aryl group is preferably an aryl group having 6 to 18 carbon atoms, more preferably an aryl group having 6 to 12 carbon atoms, and further preferably an aryl group having 6 to 10 carbon atoms.

In formulas (4) and (5), examples of the substituent of the alkyl group or the aryl group include halogen atoms, preferably a fluorine atom.

In addition, in formula (4), all of $R_{401}$ to $R_{403}$ are preferably alkyl groups. In addition, in formula (5), all of $R_{501}$ to $R_{503}$ are preferably alkyl groups.

In addition, the cellulose derivative-containing separator can be preferably obtained by treating a cellulose-containing separator using a phosphate.

Specific examples of the phosphate include trimethyl phosphate, triethyl phosphate, tripropyl phosphate, trioctyl phosphate, and triphenyl phosphate. In addition, compounds having a structure in which at least one of the hydrogen atoms of an unsubstituted phosphate are replaced by halogen atoms, such as fluorine atoms and chlorine atoms, may be used. Examples thereof include tristrifluoroethyl phosphate and tristrichloroethyl phosphate. Among these, particularly, triethyl phosphate, trioctyl phosphate, and the like, which are liquids at ordinary temperature and are relatively stable also from an electrochemical viewpoint, are preferred.

In addition, the cellulose derivative-containing separator can also be obtained by treating a cellulose-containing separator using a phosphite. Specific examples of the phosphite include trimethyl phosphite, triethyl phosphite, tripropyl phosphite, trioctyl phosphite, or triphenyl phosphite. In addition, compounds having a structure in which at least one of the hydrogen atoms of an unsubstituted phosphite are replaced by halogen atoms, such as fluorine atoms and chlorine atoms, may be used. Examples of such compounds include tristrifluoroethyl phosphite or tristrichloroethyl phosphite.

Here, the treatment of a cellulose-containing separator with a phosphate will be described. In this exemplary embodiment, a cellulose-containing separator is brought into contact with a solution comprising a phosphate or a phosphite and water. In addition, it is preferred that heat treatment is performed in a state in which the cellulose-containing separator is brought into contact with the solution. Here, it is preferred that the cellulose-containing separator is immersed in the phosphate, and then, water is added. By previously immersing the cellulose-containing separator in the phosphate and then adding water, the situation in which phosphoric acid produced by hydrolysis dissolves the cellulose-containing separator can be further reduced. At this time, it is preferred that the cellulose-containing separator is immersed in the phosphate or the phosphite, and then, water is added in a state in which the phosphate or the phosphite is controlled to a predetermined temperature by heat treatment. It is possible to immerse the cellulose-containing separator in the phosphate or the phosphite, then add water, and then set the solution to a predetermined temperature by heat treatment.

The temperature of the solution in the heat treatment is preferably 70° C. or more and 150° C. or less, more preferably 100° C. or more and 140° C. or less, from the viewpoint that the hydroxy group of the cellulose reacts easily with the hydrolyzed phosphate to produce a phosphoric acid residue.

The time of the heat treatment is not particularly limited and is, for example, 30 minutes or more.

In addition, it is preferred that water is slowly added to a predetermined amount to the phosphate or the phosphite in which the cellulose-containing separator is immersed.

The amount of water is not particularly limited and is, for example, 1 part by mass or more and 50 parts by mass or less, preferably 40 parts by mass or less, and more preferably 30 parts by mass or less, based on 100 parts by mass of the phosphate or the phosphite. By setting the amount of water to 1 part by mass or more based on the phosphate or the phosphite, the phosphate or the phosphite is easily hydrolyzed. By setting the amount of water to 40 parts by mass or less, the proportion of the hydrolysis of the phosphate or the phosphite is easily controlled.

It is thought that by bringing a cellulose-containing separator with a solution comprising a phosphate and water, preferably heating the cellulose-containing separator in the solution, the hydroxy group of the cellulose will be phosphated. In other words, when water is added to a phosphate, such as triethyl phosphate, the phosphate is hydrolyzed. Then, it is thought that by performing heat treatment, the hydrolyzed phosphate reacts with the hydroxy group of the cellulose, and thus, a phosphoric acid residue is added to the cellulose-containing separator. At this time, by performing heat treatment, the reaction of the hydrolyzed phosphate with the hydroxy group of the cellulose can be promoted. In addition, by the heat treatment, the water evaporates, and a dehydration reaction occurs more easily.

At this time, in order to promote the reaction of the hydrolyzed phosphate with the hydroxyl group of the cellulose, an appropriate amount of an acid may be added to the solution. Examples of the acid include hydrochloric acid, sulfuric acid, concentrated sulfuric acid, and phosphoric acid. The pH of the solution is preferably 1 to 8, more preferably 3 to 7.

After the heat treatment in the solution, drying treatment can be appropriately carried out.

After the hydroxy group is replaced by a phosphoric acid residue or a phosphorous acid residue, the solution can be removed by washing. Examples of the solvent used for the washing include a nonaqueous solvent, such as chloroform, acetonitrile, or hexane.

By treating a cellulose-containing separator using a phosphate as described above, a phosphoric acid residue is introduced into the cellulose surface of the cellulose-containing separator, and a cellulose derivative-containing separator is made.

The cellulose-containing separator subjected to the treatment is preferably a cellulose-containing separator comprising cellulose fibers as a main component. In addition, preferably 30% by mass or more, more preferably 50% by mass or more, further preferably 70% or more, and particularly preferably 90% or more, of cellulose fibers in the constituent materials of the separator are included.

(Glass Fiber-Containing Separator)

A secondary battery in one aspect of this exemplary embodiment comprises a glass fiber-containing separator containing glass fibers.

The glass fibers are not particularly limited. Examples thereof include microfiber wools, glass long fibers, glass wools, and glass fibers.

In addition, the glass material-containing separator may comprise particles comprising an inorganic material (hereinafter also abbreviated as inorganic particles). Examples of the inorganic particles include alumina particles, silica particles, carbon material particles, titanium oxide particles, boron oxide particles, quartz glass particles, silicon oxide particles, calcium oxide particles, magnesium oxide particles, potassium oxide particles, sodium oxide particles, aluminum nitride particles, or silicon nitride particles. Among these, alumina particles or silica particles are preferably used as the inorganic particles. The inorganic particles can, for example, be fixed in inorganic fibers using a binder or the like. In addition, the inorganic particles may be included in glass fibers.

In addition, the glass material-containing separator may be used, for example, after being surface-treated with a solution comprising calcium fluoride, barium sulfate, barium fluoride, a calcium salt, a sodium salt, a magnesium salt, a potassium salt, an amidosulfate, or the like. Specific examples of the glass material-containing separator can include a separator in which a glass cloth obtained by making glass fibers in the form of a woven fabric (Sawada Chemical; nonflammable mesh) is surface-treated by spraying an aqueous solution comprising an amidosulfate (Sawada Chemical; Not Burn).

The glass fiber-containing separator preferably has a shrinkage rate of 30% or less when held at 200° C. for 10 seconds, and more preferably has a shrinkage rate of 10% or less when held at 300° C. for 10 seconds.

In addition, mortar or concrete into which alkali-resistant glass fibers are mixed for reinforcement may be used as the glass fiber-containing separator.

The glass fiber-containing separator can be obtained, for example, by forming glass fibers in the form of a sheet, a film, a mesh, or a cloth. For example, it is possible to entangle glass fibers mechanically or by using chemical action to form the glass fibers into the form of a sheet or a fabric to obtain a glass fiber-containing separator. At this time, in order to further adhere the glass fibers, a binder may be added. In addition, the glass fiber-containing separator can also be obtained by weaving glass fibers, which is twisted in the form of yarns, in the form of a fabric, a film, a sheet, a mesh, or a cloth. Examples of the glass fiber-containing separator include nonwoven fabrics and thin film glass cloths made of glass fibers. The glass fiber-containing separator is desirably a woven fabric because the amount of the binder is small, and it is also easy to form a thin film of 50 μm or less. In addition, the glass fiber-containing separator can be obtained by coating with an organic or inorganic binder a knitted fabric obtained by knitting glass fibers in the form of a sheet or a mesh, and then drying the coated knitted fabric for several seconds using a gas burner or the like for heat treatment. In addition, the glass fiber-containing separator can be obtained by coating with an organic or inorganic binder a knitted fabric obtained by knitting glass fibers in the form of a sheet or a mesh, and then subjecting the coated knitted fabric to drying treatment in a vacuum at 100° C. or more. The heat shrinkage rate of the knitted fabric due to this heat treatment or heat drying treatment is desirably 20% or less, more desirably 5% or less, of the original size.

In addition, the glass fiber-containing separator preferably comprises glass fibers as a main component, and more preferably further comprises silica particles or alumina particles.

The glass fiber-containing separator preferably comprises 30% by mass or more, more preferably 50% by mass or more, further preferably 70% or more, and particularly preferably 90% or more, of glass fibers in the constituents of the separator.

In addition, the glass fiber-containing separator may be one in which glass fibers is used as a main component and the strength of the glass fibers is increased with an organic or inorganic binder. The amount of the organic binder is preferably 20% by mass or less in the constituents of the glass fiber-containing separator from the viewpoint of improving heat resistance and is more preferably 10% by mass or less.

In addition, the shape of the glass fiber-containing separator is not particularly limited and is, for example, a paper form, a mesh form, or a plate form. Among these, the glass fiber-containing separator in the form of a mesh obtained by weaving glass fibers as a knitted fabric is desired in order to decrease the amount of the binder. Examples of the weave include plain weave, twill weave, sateen weave, leno weave, mock leno weave, broken twill weave, and double weave.

The thickness of the glass fiber-containing separator is not particularly limited, and is preferably 10 μm or more and 200 μm or less, more preferably 15 μm or more and 100 μm or less, and further preferably 20 μm or more and 50 μm or less when one sheet is used alone. When the thickness is 10 μm or more, the strength in the film thickness direction is improved, and the rate of occurrence of an internal short circuit can be more effectively suppressed. When the thickness is 200 μm or less, an increase in internal resistance and a decrease in discharge capacity can be more effectively suppressed. When a separator is provided by lamination with other films, each thickness should be appropriately determined considering the total thickness of the film formed by lamination.

The porosity of the glass fiber-containing separator is preferably 50% or more and 95% or less. When the porosity is 50% or more, the situation in which the accumulation of side reaction products inhibits the movement of ions is suppressed, and the capacity retention rate can be more effectively improved. When the porosity is 95% or less, the occurrence of an internal short circuit is more effectively suppressed. The porosity can be obtained, for example, from the true density and total volume of materials that are the raw materials of the microporous film, and the weight and volume of the microporous film.

In addition, the cellulose-containing separator, the cellulose derivative-containing separator, or the glass fiber-containing separator may comprise an olefinic polymer, carbon fibers, or the like as a filler.

[2] Electrolytic Solution

The electrolytic solution in this exemplary embodiment comprises a nonaqueous electrolytic solvent, and the nonaqueous electrolytic solvent comprises a fluorinated solvent. In addition, the electrolytic solution can comprise a supporting salt.

As the fluorinated solvent, compounds containing a fluorine atom can be used. Examples thereof include a fluorinated ether, a fluorinated carboxylate, a fluorinated phosphate, and a fluorinated carbonate. In other words, the electrolytic solution can comprise as the fluorinated solvent at least one selected from a fluorinated ether, a fluorinated phosphate, a fluorinated carboxylate, and a fluorinated carbonate. These fluorinated products generally have high oxidation resistance, and can suppress the decomposition of the electrolytic solution even when a positive electrode active material having an operating potential as high as 4.5 V or more is used. Further, it has been found that the function of an oxidation-resistant separator can be enhanced by comprising a fluorinated product in a solvent. The decomposition of the electrolytic solution is suppressed, and thus, the situation in which the decomposed components of the electrolytic solution are deposited on the separator to cause clogging is reduced, and gas generation due to the decomposition of the electrolytic solution is reduced. Therefore, it is presumed that as a result, the function of the separator is improved.

The content of the fluorinated solvent in the nonaqueous electrolytic solvent is, for example, 10 to 90% by volume, preferably 20 to 80% by volume.

(Fluorinated Ether)

In this exemplary embodiment, examples of the fluorinated solvent include a fluorinated ether represented by the following formula (1-1). By using the electrolytic solution comprising the fluorinated ether, the capacity retention rate in a high temperature environment can be further improved and gas generation can be suppressed even when a 5 V class active material is used.

$$R_{101}—O—R_{102} \quad (1\text{-}1)$$

wherein $R_{101}$ and $R_{102}$ each independently represent an alkyl group or a fluorine-substituted alkyl group, and at least one of $R_{101}$ and $R_{102}$ is a fluorine-substituted alkyl group.

In $R_{101}$ and $R_{102}$, the number of carbon atoms of the alkyl group is preferably 1 to 12, more preferably 1 to 8, further preferably 1 to 6, and particularly preferably 1 to 4. In addition, the total number of carbon atoms of $R_{101}$ and $R_{102}$ is preferably 10 or less. In addition, in formula (1-1), the alkyl group includes a linear, branched, or cyclic one, and is preferably linear.

At least one of $R_{101}$ and $R_{102}$ is a fluorine-substituted alkyl group. The fluorine-substituted alkyl group represents a substituted alkyl group having a structure in which at least one hydrogen atom of an unsubstituted alkyl group is replaced by a fluorine atom. In addition, the fluorine-substituted alkyl group is preferably linear. In addition, $R_{101}$ and $R_{102}$ are each independently preferably a fluorine-substituted alkyl group having 1 to 6 carbon atoms, more preferably a fluorine-substituted alkyl group having 1 to 4 carbon atoms.

The fluorinated ether is preferably a compound represented by the following formula (1-2) from the viewpoint of voltage resistance and compatibility with other electrolytes.

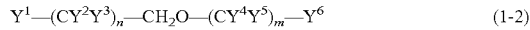

$$Y^1—(CY^2Y^3)_n—CH_2O—(CY^4Y^5)_m—Y^6 \quad (1\text{-}2)$$

wherein n is 1 to 8, and m is 1 to 8; and $Y^1$ to $Y^8$ are each independently a fluorine atom or a hydrogen atom provided that at least one of $Y^1$ to $Y^3$ is a fluorine atom, and at least one of $Y^4$ to $Y^6$ is a fluorine atom.

In formula (1-2), when n is 2 or more, $Y^2$ and $Y^3$ may each be independent for each carbon atom to which they are bonded. When m is 2 or more, $Y^4$ and $Y^5$ may each be independent for each carbon atom to which they are bonded.

In addition, the fluorinated ether is more preferably represented by the following formula (1-3) from the viewpoint of the viscosity of the electrolytic solution and compatibility with other solvents.

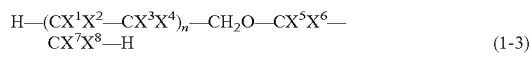

$$H—(CX^1X^2—CX^3X^4)_n—CH_2O—CX^5X^6— \\ CX^7X^8—H \quad (1\text{-}3)$$

wherein n is 1, 2, 3 or 4; $X^1$ to $X^8$ are each independently a fluorine atom or a hydrogen atom provided that at least one of $X^1$ to $X^4$ is a fluorine atom, and at least one of $X^5$ to $X^8$ is a fluorine atom; and $X^1$ to $X^4$ may each be independent for each n.

In formula (1-3), n is preferably 1 or 2, and n is more preferably 1.

In addition, in formula (1-3), the atomic ratio of fluorine atoms to hydrogen atoms [(the total number of fluorine atoms)/(the total number of hydrogen atoms)] is preferably 1 or more.

In addition, the fluorinated ether is preferably a compound represented by the following formula (1-4) from the viewpoint of voltage resistance and compatibility with other electrolytes.

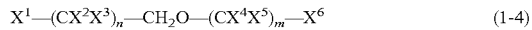

$$X^1—(CX^2X^3)_n—CH_2O—(CX^4X^5)_m—X^6 \quad (1\text{-}4)$$

wherein n is 1 to 8, m is 2 to 4, and $X^1$ to $X^6$ are each independently a fluorine atom or a hydrogen atom provided that at least one of $X^1$ to $X^3$ is a fluorine atom, and at least one of $X^4$ to $X^6$ is a fluorine atom.

In formula (1-4), when n is 2 or more, $X^2$ and $X^3$ may each be independent for each carbon atom to which they are bonded. When m is 2 or more, $X^4$ and $X^5$ may each be independent for each carbon atom to which they are bonded.

Examples of the fluorinated ether include $CF_3OCH_3$, $CF_3OC_2H_6$, $F(CF_2)_2OCH_3$, $F(CF_2)_2OC_2H_5$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $(CF_3)_2CHOCH_3$, $(CF_3)_2CHCF_2OCH_3$, $CF_3CHFCF_2OCH_3$, $CF_3CHFCF_2OCH_2CH_3$, $CF_3CHFCF_2CH_2OCHF_2$, $H(CF_2)_2CH_2OCF_2CHFCF_3$, $CHF_2—CH_2—O—CF_2CFH—CF_3$, and $F(CF_2)_2CH_2OCF_2CFHCF_3$.

The content of the fluorinated ether in the nonaqueous electrolytic solvent is, for example, 1 to 80% by volume, preferably 1 to 70% by volume. In addition, the content of the fluorinated ether in the nonaqueous electrolytic solvent is preferably 5% by volume or more, more preferably 10% by volume or more, further preferably 20% by volume or more, and particularly preferably 30% by volume or more. When the content of the fluorinated ether is 5% by volume or more, the oxidative decomposition of the electrolytic solution on the positive electrode is further suppressed. In addition, the content of the fluorinated ether in the nonaqueous electrolytic solvent is preferably 80% by volume or less, preferably 70% by volume or less, preferably 60% by volume or less, preferably 50% by volume or less, and preferably 40% by volume or less. When the content of the fluorinated ether is 80% by volume or less, the dissociation of the Li ion in the supporting salt occurs easily, and the conductivity of the electrolytic solution is further improved.

The nonaqueous electrolytic solvent can also comprise a solvent other than the fluorinated solvent. The nonaqueous electrolytic solvent other than the fluorinated solvent is not particularly limited. Examples thereof include aprotic organic solvents, such as cyclic carbonates, such as propylene carbonate (PC), ethylene carbonate (EC), butylene carbonate (BC), and vinylene carbonate (VC); chain carbonates, such as dimethyl carbonate (DMC), diethyl carbonate (DEC), ethyl methyl carbonate (EMC), and dipropyl carbonate (DPC); propylene carbonate derivatives; aliphatic carboxylates, such as methyl formate, methyl acetate, and ethyl propionate; chain ethers, such as diethyl ether, ethyl propyl ether, 1,2-ethoxyethane (DEE), and ethoxymethoxyethane (EME); γ-lactones, such as γ-butyrolactone; phosphates; and cyclic ethers, such as tetrahydrofuran and 2-methyltetrahydrofuran.

In addition, examples of the nonaqueous electrolytic solvent include dimethyl sulfoxide, 1,3-dioxolane, formamide, acetamide, dimethylformamide, dioxolane, acetonitrile, propylnitrile, nitromethane, ethyl monoglyme, phosphate triester, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, 1,3-propanesultone, anisole, and N-methylpyrrolidone.

One nonaqueous electrolytic solvent can be used alone, or two or more nonaqueous electrolytic solvents can be mixed and used.

As the nonaqueous electrolytic solvent, cyclic carbonate compounds, such as propylene carbonate (PC) and ethylene carbonate (EC), can be used in order to increase the dielectric constant of the solvent. In addition, for the purpose of the reduction of viscosity, and the like, chain monocarbonates, such as dimethyl carbonate (DMC), ethyl methyl carbonate (EMC), and diethyl carbonate (DEC), can be used. One of these nonaqueous electrolytic solvents can be used alone, or two or more of these nonaqueous electrolytic solvents can be used in combination.

The nonaqueous electrolytic solvent preferably comprises a carbonate compound in addition to the fluorinated ether. By using the carbonate compound, the ion dissociation properties of the electrolytic solution are improved, and the viscosity of the electrolytic solution decreases. Therefore, the ion mobility can be improved. Examples of the carbonate compound include the cyclic carbonates and the chain carbonates as described above. Examples of the carbonate compound include ethylene carbonate (EC), propylene carbonate (PC), butylene carbonate (BC), vinylene carbonate (VC), dimethyl carbonate (DMC), diethyl carbonate (DEC), ethyl methyl carbonate (MEC), and dipropyl carbonate (DPC) as described above. Therefore, the nonaqueous electrolytic solvent in this exemplary embodiment preferably comprises a fluorinated ether and a carbonate compound. Advantages of the carbonate compound are that the relative dielectric constant is large, and therefore, the ion dissociation properties of the nonaqueous electrolytic solvent are improved, and further, the viscosity of the nonaqueous electrolytic solvent decreases, and therefore, the ion mobility is improved. But, when a carbonate compound having a carbonate structure is used as the solvent, the carbonate compound tends to decompose easily to generate a gas comprising $CO_2$. In particular, in the case of a laminate type secondary battery, when a gas is produced inside, the problem of blistering emerges, easily leading to performance decrease. In this exemplary embodiment, even when the carbonate compound is included as the solvent, blistering due to gas generation can be effectively suppressed by comprising the fluorinated ether. This is presumed to be because the oxidation resistance of the fluorinated ether is high, and decomposition does not occur easily. In this case, the content of the fluorinated ether in the nonaqueous electrolytic solvent is preferably 10 to 80% by volume, more preferably 10 to 50% by volume. In addition, the content of the carbonate compound in the nonaqueous electrolytic solvent is preferably 10 to 90% by volume, preferably 30 to 90% by volume, preferably 50 to 90% by volume, and preferably 50 to 80% by volume.

The nonaqueous electrolytic solvent preferably comprises a sulfone compound other than the fluorinated solvent. The sulfone compound has a relatively high dielectric constant, has better oxidation resistance than cyclic carbonates, and can dissolve the supporting salt in a wide composition range with the fluorinated solvent. Particularly, the sulfone compound is preferably used with the fluorinated ether and a fluorinated phosphate described later. Both the sulfone compound and the fluorinated ether have excellent oxidation resistance, and therefore, gas generation in high temperature cycles can be significantly suppressed. In addition, in this exemplary embodiment, the nonaqueous electrolytic solvent preferably comprises a fluorinated ether, a carbonate compound, and a sulfone compound. By containing the sulfone compound, gas generation from the nonaqueous electrolytic solvent can be suppressed.

The sulfone compound is represented by the following formula (A).

(A)

wherein $R_1$ and $R_2$ each independently represent a substituted or unsubstituted alkyl group; and a carbon atom of $R_1$ and a carbon atom of $R_2$ may be bonded via a single bond or a double bond to form a cyclic structure.

In the sulfone compound represented by formula (A), the number of carbon atoms of $R_1$, $n_1$, and the number of carbon atoms of $R_2$, $n_2$, are preferably $1 \leq n_1 \leq 12$ and $1 \leq n_2 \leq 12$, more preferably $1 \leq n_1 \leq 6$ and $1 \leq n_2 \leq 6$, and further preferably $1 \leq n_1 \leq 3$ and $1 \leq n_2 \leq 3$, respectively. In addition, the alkyl group includes a linear, branched, or cyclic one.

In addition, the sulfone compound is preferably a cyclic sulfone compound represented by the following formula (A-1).

(A-1)

wherein $R_3$ represents a substituted or unsubstituted alkylene group.

In $R_3$, the number of carbon atoms of the alkylene group is preferably 4 to 9, further preferably 4 to 6.

Preferred examples of the cyclic sulfone compound represented by formula (A-1) include tetramethylene sulfone, pentamethylene sulfone, and hexamethylene sulfone. Preferred examples of the cyclic sulfone compound having a substituent include 3-methylsulfolane and 2,4-dimethylsulfolane. Advantages of these materials are that they have compatibility with the fluorinated ether, and have a relatively high dielectric constant and therefore have excellent lithium salt dissolution/dissociation action.

In addition, the sulfone compound may be a chain sulfone compound. Examples of the chain sulfone compound include ethyl methyl sulfone, ethyl isopropyl sulfone, ethyl isobutyl sulfone, dimethyl sulfone, and diethyl sulfone. Among these, ethyl methyl sulfone, ethyl isopropyl sulfone, and ethyl isobutyl sulfone are preferred. Advantages of these materials are that they have compatibility with fluorinated ether compounds, and have a relatively high dielectric constant and therefore have excellent lithium salt dissolution/dissociation action.

The content of the sulfone compound is preferably 5% by volume or more and 75% by volume or less, more preferably 10% by volume or more and 50% by volume or less, in the nonaqueous electrolytic solvent. When the content of the sulfone compound is too low, the compatibility of the electrolytic solution decreases. When the content is too high, the viscosity of the electrolytic solution increases, causing a decrease in capacity in cycle characteristics particularly at room temperature.

(Fluorinated Phosphate)

In this exemplary embodiment, examples of the fluorinated solvent include a fluorinated phosphate represented by the following formula (2-1). By using the electrolytic solution comprising the fluorinated phosphate, the cycle retention rate in a high temperature environment can be further improved even when a 5 V class active material is used.

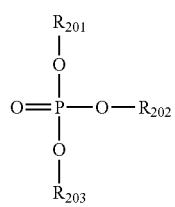

(2-1)

wherein $R_{201}$, $R_{202}$, and $R_{203}$ each independently represent an alkyl group or a fluorine-substituted alkyl group, and at least one of $R_{201}$, $R_{202}$, and $R_{203}$ is a fluorine-substituted alkyl group.

In formula (2-1), in $R_{201}$, $R_{202}$, and $R_{203}$, the number of carbon atoms of the alkyl group or the fluorine-substituted alkyl group is preferably 1 to 12, more preferably 1 to 10, further preferably 1 to 6, further preferably 1 to 5, and particularly preferably 1 to 4. In addition, the total number of carbon atoms of $R_{201}$, $R_{202}$, and $R_{203}$ is preferably 10 or less. It is preferred that the fluorine-substituted alkyl group has 1 to 5 carbon atoms, the alkyl group is an alkyl group having 1 to 10 carbon atoms, and the total number of carbon atoms of $R_{201}$, $R_{202}$, and $R_{203}$ is 10 or less.

The fluorine-substituted alkyl group represents a substituted alkyl group having a structure in which at least one hydrogen atom of an unsubstituted alkyl group is replaced by a fluorine atom. In addition, the alkyl group includes a linear, branched, or cyclic one, and the fluorine-substituted alkyl group is preferably linear.

In formula (2-1), for example, $R_{201}$, $R_{202}$, and $R_{203}$ are each independently preferably a fluorine-substituted alkyl group. In addition, in formula (2-1), $R_{201}$, $R_{202}$, and $R_{203}$ are each more preferably the same fluorine-substituted alkyl group.

Specific examples of the fluorinated phosphate include 2,2,2-trifluoroethyl dimethyl phosphate, bis(trifluoroethyl) methyl phosphate, bistrifluoroethyl ethyl phosphate, pentafluoropropyl dimethyl phosphate, heptafluorobutyl dimethyl phosphate, trifluoroethyl methyl ethyl phosphate, pentafluoropropyl methyl propyl phosphate, heptafluorobutyl methyl propyl phosphate, trifluoroethyl methyl butyl phosphate, pentafluoropropyl diethyl phosphate, heptafluorobutyl diethyl phosphate, trifluoroethyl ethyl propyl phosphate, pentafluoropropyl ethyl propyl phosphate, heptafluorobutyl ethyl propyl phosphate, trifluoroethyl ethyl butyl phosphate, pentafluoropropyl ethyl butyl phosphate, heptafluorobutyl ethyl butyl phosphate, trifluoroethyl dipropyl phosphate, pentafluoropropyl dipropyl phosphate, heptafluorobutyl dipropyl phosphate, trifluoroethyl propyl butyl phosphate, pentafluoropropyl propyl butyl phosphate, heptafluorobutyl propyl butyl phosphate, trifluoroethyl dibutyl phosphate, pentafluoropropyl dibutyl phosphate, and heptafluorobutyl dibutyl phosphate. In addition, examples of the fluorinated phosphate include tris(trifluoromethyl)phosphate, tris(trifluoroethyl)phosphate, tris(tetrafluoropropyl)phosphate, tris(pentafluoropropyl)phosphate, tris(heptafluorobutyl)phosphate, and tris(octafluoropentyl)phosphate. In addition, examples of the fluorinated phosphate include trifluoroethyl dimethyl phosphate, pentafluoropropyl dimethyl phosphate, pentafluoropropyl methyl ethyl phosphate, heptafluorobutyl methyl ethyl phosphate, trifluoroethyl methyl propyl phosphate, pentafluoropropyl methyl butyl phosphate, heptafluorobutyl methyl butyl phosphate, and trifluoroethyl diethyl phosphate.

Examples of the tris(tetrafluoropropyl)phosphate include tris(2,2,3,3-tetrafluoropropyl) phosphate. Examples of the tris(pentafluoropropyl)phosphate include tris(2,2,3,3-pentafluoropropyl)phosphate. Examples of the tris(trifluoroethyl) phosphate include tris(2,2,2-trifluoroethyl)phosphate. Examples of the tris(heptafluorobutyl)phosphate include tris (1H,1H-heptafluorobutyl)phosphate. Examples of the phosphate tris(octafluoropentyl) include tris(1H,1H,5H-octafluoropentyl)phosphate.

As the fluorinated phosphate, tris(2,2,2-trifluoroethyl) phosphate represented by the following formula (2-2) is preferred because the effect of suppressing electrolytic solution decomposition at high potential is high.

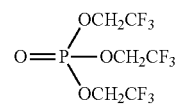

(2-2)

One fluorinated phosphate can be used alone, or two or more fluorinated phosphates can be mixed and used.

The content of the fluorinated phosphate in the nonaqueous electrolytic solvent is not particularly limited and is, for example, 5 to 80% by volume. In addition, the content of the fluorinated phosphate in the nonaqueous electrolytic solvent is preferably 10% by volume or more, more preferably 15% by volume or more, and further preferably 20% by volume or more. When the content of the fluorinated phosphate is 10% by volume or more, the oxidative decomposition of the electrolytic solution on the positive electrode is further suppressed. In addition, the content of the fluorinated phosphate in the nonaqueous electrolytic solvent is preferably 70% by volume or less, more preferably 60% by volume or less, and further preferably 50% by volume or less. When the content of the fluorinated phosphate is 70% by volume or less, the dissociation of the Li ion in the supporting salt occurs easily, and the conductivity of the electrolytic solution is improved.

The nonaqueous electrolytic solvent preferably comprises a carbonate compound in addition to the fluorinated phosphate. By using the carbonate compound, the ion dissociation properties of the electrolytic solution are improved, and the viscosity of the electrolytic solution decreases. Therefore, the ion mobility can be improved. Therefore, the nonaqueous electrolytic solvent in this exemplary embodiment preferably comprises a fluorinated phosphate and a carbonate compound. Advantages of the carbonate compound are that the relative dielectric constant is large, and therefore, the ion dissociation properties of the nonaqueous electrolytic solvent are improved, and further, the viscosity of the nonaqueous electrolytic solvent decreases, and therefore, the ion mobility is improved. But, when a carbonate compound having a carbonate structure is used as the solvent, the carbonate compound tends to decompose easily to generate a gas comprising $CO_2$. In particular, in the case of a laminate type secondary battery, when a gas is produced inside, the problem of blistering emerges, easily leading to performance decrease. In this exemplary embodiment, even when the carbonate compound is included as the solvent, blistering due to gas generation can be effectively suppressed by including the fluorinated phosphate. This is presumed to be because the oxidation resistance of the fluorinated phosphate is high, and decomposition does not occur easily. In this case, the content of the fluorinated phosphate in the nonaqueous electrolytic solvent is preferably 10 to 80% by volume, more preferably 10 to 50% by volume. In addition, the content of the carbonate compound in the nonaqueous electrolytic solvent is preferably 10 to 90% by volume, preferably 30 to 90% by volume, preferably 50 to 90% by volume, and preferably 50 to 80% by volume.

The nonaqueous electrolytic solution solvent preferably comprises a sulfone compound in addition to the fluorinated phosphate. In addition, the nonaqueous electrolytic solution solvent preferably comprises a fluorinated phosphate, a carbonate compound, and a sulfone compound.

(Fluorinated Carboxylate)

In this exemplary embodiment, examples of the fluorinated solvent include a fluorinated carboxylate represented by the following formula (3-1). By using the electrolytic solution comprising the fluorinated carboxylate, the cycle retention rate in a high temperature environment can be further improved even when a 5 V class active material is used.

The fluorinated carboxylate is represented by the following formula (3-1).

(3-1)

wherein $R_{301}$ and $R_{302}$ each independently represent an alkyl group or a fluorine-substituted alkyl group, and at least one of $R_{301}$ and $R_{302}$ is a fluorine-substituted alkyl group.

In formula (3-1), in $R_{301}$ and $R_{302}$, the number of carbon atoms of the alkyl group or the fluorine-substituted alkyl group is preferably 1 to 12, more preferably 1 to 8, further preferably 1 to 6, further preferably 1 to 5, and particularly preferably 1 to 4. In addition, the total number of carbon atoms of $R_{301}$ and $R_{302}$ is preferably 10 or less. It is preferred that the fluorine-substituted alkyl group has 1 to 5 carbon atoms, the alkyl group is an alkyl group having 1 to 10 carbon atoms, and the total number of carbon atoms of $R_{301}$ and $R_{302}$ is 10 or less.

The fluorine-substituted alkyl group represents a substituted alkyl group having a structure in which at least one hydrogen atom of an unsubstituted alkyl group is replaced by a fluorine atom. In addition, the alkyl group includes a linear, branched, or cyclic one, and the fluorine-substituted alkyl group is preferably linear or branched.

In formula (3-1), for example, $R_{301}$ and $R_{302}$ are each independently a fluorine-substituted alkyl group. In addition, in formula (3-1), for example, $R_{301}$ is an alkyl group, and $R_{302}$ is a fluorine-substituted alkyl group. In addition, in formula (3-1), for example, $R_{301}$ is a fluorine-substituted alkyl group, and $R_{302}$ is an alkyl group.

The fluorinated carboxylate is preferably a compound represented by the following (3-2).

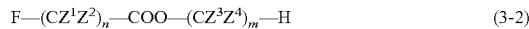

(3-2)

wherein n is 1 to 4, m is 1 to 4, and $Z^1$ to $Z^4$ are each independently a fluorine atom or a hydrogen atom provided that at least one of $Z^1$ and $Z^2$ is a fluorine atom, and at least one of $Z^3$ and $Z^4$ is a fluorine atom.

In addition, the fluorinated carboxylate is preferably a compound represented by the following (3-3).

(3-3)

wherein n is 1 to 4, m is 1 to 4, and $Z^1$ to $Z^4$ are each independently a fluorine atom or a hydrogen atom provided that at least one of $Z^1$ to $Z^2$ is a fluorine atom.

In formula (3-3), when n is 2 or more, $Z^1$ and $Z^2$ may each be independent for each carbon atom to which they are bonded. When m is 2 or more, $Z^3$ and $Z^4$ may each be independent for each carbon atom to which they are bonded.

Examples of the fluorinated carboxylate include $CF_3COOCH_3$, $CF_3COOC_2H_6$, $F(CF_2)_2COOCH_3$, $F(CF_2)_2COOC_2H_5$, $F(CF_2)_3COOCH_3$, $F(CF_2)_3COOC_2H_5$, $F(CF_2)_4COOCH_3$, $F(CF_2)_4COOC_2H_5$, $F(CF_2)_5COOCH_3$, $F(CF_2)_5COOC_2H_5$, $F(CF_2)_8COOCH_3$, $F(CF_2)_8COOC_2H_5$, $F(CF_2)_9COOCH_3$, $CF_3CH_2COOCH_3$, $CF_3CH_2COOCHF_2$, $CF_3CF_2CH_2COOCH_3$, $CF_3CF_2CH_2COOCHF_2$, $CF_3CF_2CH_2COO(CF_2)_2H$, $CF_3CF_2CH_2COO(CF_2)_2F$, $HCF_2CH_2COOCH_3$, $H(CF_2)_2COOCH_2CH_3$, $H(CF_2)_2COOCH_2CF_3$, $H(CF_2)_2CH_2COOCHF_2$, $H(CF_2)_2CH_2COO(CF_2)_2H$, $H(CF_2)_2CH_2COO(CF_2)_3H$, $H(CF_2)_3CH_2COO(CF_2)_2H$, $(CF_3)_2CHCOOCH_3$, $(CF_3)_2CHCF_2COOCH_3$, $CF_3CHFCF_2COOCH_3$, $CF_3CHFCF_2COOCH_2CH_3$, and $CF_3CHFCF_2CH_2COOCHF_2$.

In addition, examples of the fluorinated carboxylate include $CH_3COOCH_2CHF_2$, $CHF_2CF_2COOCH_3$, $CF_3CH_2COOCH_3$, $CF_3CH_2COOCH_2CH_3$, $CF_3CHFCOOCH_3$, $CF_3CF_2COOCH_3$, $CF_3CF_2COOCH_2CH_3$, $CF_3CF_2CF_2COOCH_2CH_3$, $CF_3(CF_3)CHCOOCH_3$, and $CF_3(CF_3)CFCOOCH_3$.

One fluorinated carboxylate can be used alone, or two or more fluorinated carboxylates can be mixed and used.

The content of the fluorinated carboxylate in the nonaqueous electrolytic solvent is not particularly limited and is, for example, 1 to 60% by volume. In addition, the content of the fluorinated carboxylate in the nonaqueous electrolytic solvent is preferably 5% by volume or more, more preferably 10% by volume or more, and further preferably 15% by volume or more. When the content of the fluorinated carboxylate is 5% by volume or more, the dissociation of the Li ion in the supporting salt occurs easily, and the conductivity of the electrolytic solution is improved. In addition, the content of the fluorinated carboxylate in the nonaqueous electrolytic solvent is preferably 50% by volume or less, more preferably 40% by volume or less, and further preferably 30% by volume or less. When the content of the fluorinated carboxylate is 50 volume or less, resistance increase due to a film, and gas generation due to the decomposition of the electrolytic solution can be suppressed.

The nonaqueous electrolytic solvent preferably comprises a carbonate compound in addition to the fluorinated carboxylate. By using the carbonate compound, the ion dissociation properties of the electrolytic solution are improved, and the viscosity of the electrolytic solution decreases. Therefore, the ion mobility can be improved. Therefore, the nonaqueous electrolytic solvent in this exemplary embodiment preferably comprises a fluorinated carboxylate and a carbonate compound. Advantages of the carbonate compound are that the relative dielectric constant is large, and therefore, the ion dissociation properties of the nonaqueous electrolytic solvent are improved, and further, the viscosity of the nonaqueous electrolytic solvent decreases, and therefore, the ion mobility is improved. But, when a carbonate compound having a carbonate structure is used as the solvent, the carbonate compound tends to decompose easily to generate a gas comprising $CO_2$. Particularly, in the case of a laminate type secondary battery, when a gas is produced inside, the problem of blistering emerges, easily leading to performance decrease. In this exemplary embodiment, even when the carbonate compound is included as the solvent, blistering due to gas generation can be effectively suppressed by including the fluorinated carboxylate. This is presumed to be because the oxidation resistance of the fluorinated carboxylate is high, and at least one of the fluorinated carboxylates form a film, which can suppress further decomposition of the electrolytic solution. In this case, the content of the fluorinated carboxylate in the nonaqueous electrolytic solvent is preferably 10 to 80% by volume, more preferably 10 to 50% by volume. In addition, the content of the carbonate compound in the nonaqueous electrolytic solvent is preferably 10 to 90% by volume, preferably 30 to 90% by volume, preferably 50 to 90% by volume, and preferably 50 to 80% by volume.

The nonaqueous electrolytic solution solvent preferably comprises a sulfone compound in addition to the fluorinated carboxylate. In addition, the nonaqueous electrolytic solution solvent preferably comprises a fluorinated carboxylate, a carbonate compound, and a sulfone compound.

(Fluorinated Carbonate)

In this exemplary embodiment, examples of the fluorinated solvent include a fluorinated carbonate represented by the following formula (4-1). By using the electrolytic solution comprising the fluorinated carbonate, the cycle retention rate in a high temperature environment can be further improved even when a 5 V class active material is used.

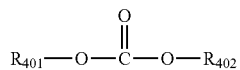

(4-1)

wherein $R_{401}$ and $R_{402}$ each independently represent an alkyl group or a fluorine-substituted alkyl group, and at least one of $R_{401}$ and $R_{402}$ is a fluorine-substituted alkyl group.

In formula (4-1), in $R_{401}$ and $R_{402}$, the number of carbon atoms of the alkyl group or the fluorine-substituted alkyl group is preferably 1 to 12, more preferably 1 to 8, further preferably 1 to 6, further preferably 1 to 5, and particularly preferably 1 to 4. In addition, the total number of carbon atoms of $R_{401}$ and $R_{402}$ is preferably 6 or less. It is preferred that the fluorine-substituted alkyl group has 1 to 3 carbon atoms, the alkyl group is an alkyl group having 1 to 10 carbon atoms, and the total number of carbon atoms of $R_{401}$ and $R_{402}$ is 6 or less.

The fluorine-substituted alkyl group represents a substituted alkyl group having a structure in which at least one hydrogen atom of an unsubstituted alkyl group is replaced by a fluorine atom. In addition, the alkyl group includes a linear, branched, or cyclic one, and the fluorine-substituted alkyl group is preferably linear.

In formula (4-1), for example, $R_{401}$ and $R_{402}$ are each independently a fluorine-substituted alkyl group. In addition, in formula (4-1), for example, $R_{401}$ is an alkyl group, and $R_{402}$ is a fluorine-substituted alkyl group. In addition, in formula (3-1), for example, $R_{401}$ is a fluorine-substituted alkyl group, and $R_{402}$ is an alkyl group.

Examples of the fluorinated carbonate include $CF_3OCOOCH_3$, $CF_3OCOOC_2H_6$, $F(CF_2)_2OCOOCH_3$, $F(CF_2)_2OCOOC_2H_5$, $F(CF_2)_3OCOOCH_3$, $F(CF_2)_3OCOOC_2H_5$, $F(CF_2)_4OCOOCH_3$, $F(CF_2)_4OCOOC_2H_5$, $F(CF_2)_5OCOOCH_3$, $F(CF_2)_5OCOOC_2H_5$, $F(CF_2)_8OCOOCH_3$, $F(CF_2)_8OCOOC_2H_5$, $F(CF_2)_9OCOOCH_3$, $CF_3CH_2OCOOCH_3$, $CF_3CH_2OCOOCHF_2$, $CF_3CF_2CH_2OCOOCH_3$, $CF_3CF_2CH_2OCOOCHF_2$, $CF_3CF_2CH_2OCOO(CF_2)_2H$, $CF_3CF_2CH_2OCOO(CF_2)_2F$, $HCF_2CH_2OCOOCH_3$, $H(CF_2)_2OCOOCH_2CH_3$, $H(CF_2)_2OCOOCH_2CF_3$, $H(CF_2)_2CH_2OCOOCHF_2$, $H(CF_2)_2CH_2OCOO(CF_2)_2H$, $H(CF_2)_2CH_2OCOO(CF_2)_3H$, $H(CF_2)_3CH_2OCOO(CF_2)_2H$, $(CF_3)_2CHCOOCH_3$, $(CF_3)_2CHCF_2OCOOCH_3$, $CF_3CHFCF_2OCOOCH_3$, $CF_3CHFCF_2OCOOCH_2CH_3$, and $CF_3CHFCF_2CH_2OCOOCHF_2$.

One fluorinated carbonate can be used alone, or two or more fluorinated carbonates can be mixed and used.

The content of the fluorinated carbonate in the nonaqueous electrolytic solvent is not particularly limited and is, for example, 1 to 50% by volume. In addition, the content of the fluorinated carbonate in the nonaqueous electrolytic solvent is preferably 5% by volume or more, more preferably 10% by volume or more, and further preferably 15% by volume or more. When the content of the fluorinated carbonate is 5% by volume or more, the oxidative decomposition of the electrolytic solution on the positive electrode can be further suppressed. In addition, the content of the fluorinated carbonate in the nonaqueous electrolytic solvent is preferably 50% by volume or less, more preferably 40% by volume or less, and further preferably 30% by volume or less. When the content of the fluorinated carbonate is 50% by volume or less, the dissociation of the Li ion in the supporting salt occurs easily, and the conductivity of the electrolytic solution is improved. In addition, it is thought that when the content of the fluorinated carbonate is 5% by volume or more, the oxidative decomposition of the electrolytic solution on the positive electrode is easily suppressed.

The nonaqueous electrolytic solvent preferably comprises a carbonate compound in addition to the fluorinated carbonate. By using the carbonate compound, the ion dissociation properties of the electrolytic solution are improved, and the viscosity of the electrolytic solution decreases. Therefore, the ion mobility can be improved. Therefore, the nonaqueous electrolytic solvent in this exemplary embodiment preferably comprises a fluorinated carbonate and a carbonate compound. Advantages of the carbonate compound are that the relative dielectric constant is large, and therefore, the ion dissociation properties of the nonaqueous electrolytic solvent are improved, and further, the viscosity of the nonaqueous electrolytic solvent decreases, and therefore, the ion mobility is improved. But, when a carbonate compound having a carbonate structure is used as the solvent, the carbonate compound tends to decompose easily to generate a gas comprising $CO_2$. Particularly, in the case of a laminate type secondary battery, when a gas is produced inside, the problem of blistering emerges, easily leading to performance decrease. In this exemplary embodiment, even when the carbonate compound is included as the solvent, blistering due to gas generation can be effectively suppressed by comprising the fluorinated carbonate. This is presumed to be because the oxidation resistance of the fluorinated carbonate is high, and decomposition does not occur easily. In this case, the content of the fluorinated carbonate in the nonaqueous electrolytic solvent is preferably 10 to 80% by volume, more preferably 10 to 50% by volume. In addition, the content of the carbonate compound in the nonaqueous electrolytic solvent is preferably 10 to 90% by volume, preferably 30 to 90% by volume, preferably 50 to 90% by volume, and preferably 50 to 80% by volume.

The nonaqueous electrolytic solution solvent preferably comprises a sulfone compound in addition to the fluorinated carbonate. In addition, the nonaqueous electrolytic solution solvent preferably comprises a fluorinated carbonate, a carbonate compound, and a sulfone compound.

The amount of the nonaqueous electrolytic solvent is not particularly limited and can be appropriately selected in a range in which the effect of this exemplary embodiment is achieved. The amount of the nonaqueous electrolytic solvent based on 100 parts by mass of the electrolytic solution is, for example, 90 parts by mass or more, preferably 95 parts by mass or more, more preferably 98 parts by mass or more, and further preferably 99 parts by mass or more.

The supporting salt is not particularly limited, and, for example, lithium salts can be used. Examples of the lithium salts include $LiPF_6$, $LiAsF_6$, $LiAlCl_4$, $LiClO_4$, $LiBF_4$, $LiSbF_6$, $LiCF_3SO_3$, $LiC_4F_9CO_3$, $LiC(CF_3SO_2)_3$, $LiN(CF_3SO_2)_2$, $LiN(C_2F_5SO_2)_2$, $LiB_{10}Cl_{10}$, lower aliphatic lithium carboxylates, chloroborane lithium, lithium tetraphenylborate, LiCl, LiBr, LiI, LiSCN, LiCl, and imides. One supporting salt can be used alone, or two or more supporting salts can be used in combination. From the viewpoint of low cost, $LiPF_6$ is preferred.

The concentration of the supporting salt can be, for example, 0.5 mol/l or more and 1.5 mol/l or less.

In this exemplary embodiment, the electrolytic solution is not limited to a liquid one and may be a gel-like one. For example, the electrolytic solution can be included in a polymer electrolyte, and the polymer electrolyte can be disposed in the secondary battery in a state in which the polymer swells with the electrolytic solution. The polymer electrolyte is excellent in terms of liquid leakage and gas generation suppression.

[3] Positive Electrode

The positive electrode in this exemplary embodiment comprises a positive electrode active material operating at a potential of 4.5 V or more versus lithium.

The positive electrode active material operating at a potential of 4.5 V or more versus lithium (hereinafter also referred to as a 5 V class active material) is preferably a lithium-containing complex oxide. Examples of the 5 V class active material of the lithium-containing complex oxide include a spinel type lithium manganese complex oxide, an olivine type lithium manganese-containing complex oxide, and an inverse spinel type lithium manganese-containing complex oxide. Examples of the 5 V class active material of the lithium-containing complex oxide include a compound represented by $Li_a(M_xMn_{2-x})O_4$, wherein 0.4<x<2 holds, and 0<a<1.2 holds; and M is at least one selected from the group consisting of Ni, Co, Fe, Cr, and Cu. Among these, the spinel type lithium manganese complex oxide is preferred from the viewpoint of safety.

In addition, as the lithium manganese complex oxide comprising Mn, for example, the so-called 5 V class manganese spinel represented by the following formula (A) can be used.

$$Li_a(M_bMn_{2-b-c}A_c)O_4 \qquad (A)$$

wherein 0<a<1.2, 0.4<b<1.2, and 0≤c≤0.3 hold; M represents one or more metals selected from Ni, Co, Fe, Cr, and Cu and including at least Ni; and A is at least one selected from Si, Ti, Mg, and Al.

As the 5 V class active material, a lithium manganese complex oxide represented by the following formula (B) is preferably used.

$$Li_a(M_xMn_{2-x-y}Y_y)(O_{4-w}Z_w) \qquad (B)$$

wherein 0.4<x≤1.2, 0≤y, x+y<2, 0≤a≤1.2, and 0≤w≤1 hold; M is at least one selected from Co, Ni, Fe, Cr, and Cu; Y is at least one selected from Li, B, Na, Mg, Al, Ti, Si, K, and Ca; and Z is at least one selected from F and Cl.

From the viewpoint of obtaining sufficient capacity and achieving longer life, among such lithium manganese complex oxides, a spinel type compound represented by the following formula (C) is more preferably used.

$$LiNi_xMn_{2-x-y}A_yO_4 \qquad (C)$$

wherein 0.4<x<0.6 and 0≤y<0.3 hold, and A represents at least one metal selected from Li, B, Na, Mg, Al, Ti, and Si.

In formula (C), preferably 0≤y<0.2 holds.

In addition, examples of other 5 V class active materials include an olivine-based compound represented by the following formula (D).

$$Li_xMPO_4F_y \qquad (D)$$

wherein 0≤x≤2 and 0≤y≤1 hold, and M is at least one selected from Co and Ni.

In addition, examples of other 5 V class active materials include a compound represented by the following formula (D).

$$Li_x[Li_aM_bMn_{1-a-b}]O_2 \qquad (E)$$

wherein 0≤x≤1, 0.05≤a≤0.3, and 0.1<b<0.4 hold, and M is at least one selected from Ni, Co, Fe, and Cr.

The content of the 5 V class active material is, for example, 60% by mass or more, is preferably 70 to 98% by mass in the positive electrode, and is more preferably 85 to 95% by mass.

The positive electrode can be made, for example, by mixing a positive electrode active material and a positive electrode binding agent to prepare a positive electrode slurry, and forming the positive electrode slurry on a positive electrode current collector.

In addition, the positive electrode may comprise a conductivity-imparting agent. As the conductivity-imparting agent, for example, powders of carbon materials, such as acetylene black, carbon black, fibrous carbon, and graphite, metal substances, such as Al, and conductive oxides can be used. The content of the conductivity-imparting agent is, for example, about 1 to 10% by mass in the positive electrode.

The positive electrode binding agent is not particularly limited, and, for example, polyvinylidene fluorides, vinylidene fluoride-hexafluoropropylene copolymers, vinylidene fluoride-tetrafluoroethylene copolymers, styrene-butadiene copolymerized rubbers, polytetrafluoroethylenes, polypropylenes, polyethylenes, polyimides, and polyamideimides can be used. Among these, polyvinylidene fluoride is preferred from the viewpoint of versatility and low cost. The content of the positive electrode binding agent is preferably about 1 to 10% by mass in the positive electrode. When the content is in such a range, the proportion of the amount of the active material in the electrode can be sufficiently ensured, and sufficient capacity per unit mass can be obtained.

As the positive electrode current collector, nickel, copper, silver, aluminum, and alloys thereof are preferred because of electrochemical stability. Examples of its shape include foil, a flat plate form, and a mesh form. Particularly, copper foil and aluminum foil are preferred.

[4] Negative Electrode

The negative electrode active material in this exemplary embodiment is not particularly limited as long as it can intercalate lithium ions during charge and deintercalate lithium ions during discharge. For example, known ones can be used.

Specific examples of the negative electrode active material include carbon materials, such as graphite, coke, and hard carbon, lithium alloys, such as lithium-aluminum alloys, lithium-lead alloys, and lithium-tin alloys, lithium metal, Si, and metal oxides having lower potential than the positive electrode active material, such as $SnO_2$, SnO, $TiO_2$, and $Nb_2O_3SiO$. Among these materials, carbon materials are preferably used.

The negative electrode can be made, for example, by forming a negative electrode active material layer comprising a negative electrode active material and a negative electrode binding agent on a negative electrode current collector. Examples of the method for forming the negative electrode active material layer include a doctor blade method, a die coater method, a CVD method, and a sputtering method. It is possible to previously form a negative electrode active material layer and then form a thin film of aluminum, nickel, or an alloy thereof by a method such as vapor deposition or sputtering to provide a negative electrode current collector.

In addition, the negative electrode may comprise a conductivity-imparting agent. Examples of the conductivity-imparting agent include powders of carbon materials and conductive oxides.

The negative electrode binding agent is not particularly limited, and, for example, polyvinylidene fluoride, vinylidene fluoride-hexafluoropropylene copolymers, vinylidene fluoride-tetrafluoroethylene copolymers, styrene-butadiene copolymerized rubbers, polytetrafluoroethylene, polypropylene, polyethylene, polyimides, and polyamideimides can be used. Among these, polyimides or polyamideimides are preferred because of strong binding properties. The amount of the negative electrode binding agent used is preferably 7 to 20 parts by mass based on 100 parts by mass of the negative electrode active material from the viewpoint of "sufficient binding force" and "higher energy" in a trade-off relationship.

As the negative electrode current collector, nickel, copper, silver, aluminum, and alloys thereof are preferred because of electrochemical stability. Examples of its shape include foil, a flat plate form, and a mesh form. Particularly, copper foil is preferred.

[5] Package

A package can be appropriately selected as long as it is stable in the electrolytic solution and has sufficient water vapor barrier properties. Examples of the shape of the package include a cylindrical form, a prismatic form (can form), and a flat plate form. As the package, one in the form of a flat plate using a laminate film is preferred.

A secondary battery in the form of a flat plate using a laminate film for a package has excellent heat dissipation properties. Therefore, it is excellent in providing a large capacity secondary battery that inputs and outputs large energy. For example, in the case of a laminate type secondary battery, as the package, an aluminum laminate film, a laminate film made of SUS, laminate films of polypropylene, polyethylene, and the like coated with silica, and the like can be used. Particularly, from the viewpoint of suppressing volume expansion and the viewpoint of cost, an aluminum laminate film is preferably used.

[6] Secondary Battery

The nonaqueous electrolyte secondary battery in this exemplary embodiment comprises a separator as an insulator held between a positive electrode and a negative electrode, and the positive electrode and the negative electrode are in a state of being immersed in a lithium ion-conducting electrolytic solution. In addition, the positive electrode, the negative electrode, and the separator can take a configuration in which they are disposed in a package. By applying voltage to the positive electrode and the negative electrode, the positive electrode active material deintercalates lithium ions, and the negative electrode active material intercalates lithium ions, and the battery is in a charged state. In a discharged state, a state opposite to the charged state is provided.

The configuration of the secondary battery according to this exemplary embodiment is not particularly limited and, for example, can be a configuration in which an electrode assembly in which a positive electrode and a negative electrode are disposed opposed to each other and an electrolytic solution are included in a package. The shape of the secondary battery is not particularly limited. Examples thereof include a cylindrical type, a flat wound prismatic type, a laminated prismatic type, a coin type, a flat wound laminate type, or a laminate type.

A laminate type secondary battery will be described below as an example. FIG. 1 is a schematic cross-sectional view showing the structure of the electrode assembly of a laminated type secondary battery using a laminate film for a package. This electrode assembly is formed in such a manner that a plurality of positive electrodes c and a plurality of negative electrodes a are alternately stacked with separators b sandwiched therebetween. The positive electrode current collectors e of the positive electrodes c are welded and electrically connected to each other at the ends not covered with the positive electrode active material, and further, a positive electrode terminal f is welded to the welded part. The negative electrode current collectors d of the negative electrodes a are welded and electrically connected to each other at the ends not covered with the negative electrode active material, and further, a negative electrode terminal g is welded to the welded part.

An advantage of an electrode assembly having such a planar laminated structure is that it does not comprise a portion having a small R (a region close to the wound core of a wound structure, the folded-back region of a flat type wound structure, or the like) and therefore is less susceptible to negative effect that may occur due a change in the volume of the electrodes that occurs during charge and discharge than an electrode assembly having a wound structure.

EXAMPLES

Examples in this exemplary embodiment will be described in detail below, but this exemplary embodiment is not limited to the following Examples.

Example 1-1

Making of Positive Electrode

Powders of $MnO_2$, NiO, $Li_2CO_3$, and $Ti_3O_3$ were used as the raw materials of a positive electrode active material, weighed so that a target composition ratio was obtained, and ground and mixed. Then, the mixed powder was fired at 750° C. for 8 hours to make $LiNi_{0.5}Mn_{1.37}Ti_{0.13}O_4$. It was confirmed that the obtained positive electrode active material was a substantially single-phase spinel structure.

The obtained positive electrode active material and carbon black as a conductivity-imparting agent were mixed, and this mixture was dispersed in a resin solution obtained by dissolving polyvinylidene fluoride (PVDF) as a binding agent in N-methylpyrrolidone, to prepare a positive electrode slurry. The mass ratio of the positive electrode active material, the conductivity-imparting agent, and the binding agent was 91/5/4.

Both surfaces of an Al current collector were uniformly coated with the obtained positive electrode slurry, and then, the coated current collector was dried in a vacuum for 12 hours and compression-molded by a roll press to make a positive electrode.

(Making of Negative Electrode)

As a negative electrode active material, graphite was used. The graphite was dispersed in a resin solution obtained by dissolving polyvinylidene fluoride (PVDF) as a binding agent in N-methylpyrrolidone, to prepare a negative electrode slurry. The mass ratio of the negative electrode active material, the conductivity-imparting agent, and the binding agent was 92/1/7.

Both surfaces of a Cu current collector were uniformly coated with the obtained negative electrode slurry, and then, the coated current collector was dried in a vacuum for 12 hours and compression-molded by a roll press to make a negative electrode.

(Electrolytic Solution)

A fluorinated ether represented by $H(CF_2)_2CH_2O(CF_2)_2H$ (FE1), ethylene carbonate (EC), and dimethyl carbonate (DMC) were mixed at EC:DMC:FE1=4:4:2 (volume ratio). $LiPF_6$ was dissolved in this mixed solvent at a concentration of 1 M to prepare an electrolytic solution.

(Making of Laminate Type Battery)

The above positive electrode and negative electrode were cut into 1.5 cm×3 cm. Five layers of the positive electrode and six layers of the negative electrode obtained were alternately stacked with cellulose nonwoven fabrics (manufactured by NIPPON KODOSHI CORPORATION, nonwoven fabrics: porosity 60%, thickness; 40 µm) as cellulose-containing separators sandwiched therebetween. Then, the ends of the positive electrode current collectors not covered with the positive electrode active material were welded, and the ends of the negative electrode current collectors not covered with the negative electrode active material were welded, and further, a positive electrode terminal made of aluminum and a positive electrode terminal made of nickel were welded to the welded parts to obtain an electrode assembly having a planar laminated structure. The above electrode assembly was wrapped in an aluminum laminate film as a package, and the above electrolytic solution was injected inside, and then, the aluminum laminate film was sealed under reduced pressure to make a secondary battery.

Example 1-2

A secondary battery was made in the same manner as Example 1-1 except that cellulose nonwoven fabrics (nonwoven fabrics: porosity 80%, thickness; 40 µm) were used as the cellulose-containing separators.

Example 1-3

A secondary battery was made in the same manner as Example 1-1 except that cellulose nonwoven fabrics comprising polypropylene (nonwoven fabrics: porosity 55%, thickness; 40 µm) were used as the cellulose-containing separators.

Example 1-4

A secondary battery was made in the same manner as Example 1-1 except that glass fiber-containing separators (manufactured by Nippon Sheet Glass Co., Ltd., nonwoven fabrics: porosity 90%, thickness; 50 µm, trade name TGP-005F) were used instead of the cellulose-containing separators.

Example 1-5

EC, DMC, and FE1 were mixed at EC/DMC/FE1=4/2/4 (volume ratio) to prepare a mixed solvent. $LiPF_6$ was dissolved in this mixed solvent at a concentration of 1 M to prepare an electrolytic solution (EC:DMC:FE1=4:2:4). A secondary battery was made in the same manner as Example 1-1 except that this obtained electrolytic solution (EC:DMC:FE1=4:2:4) was used.

Example 1-6

A secondary battery was made in the same manner as Example 1-5 except that glass fiber-containing separators (manufactured by Nippon Sheet Glass Co., Ltd., nonwoven fabrics: porosity 90%, thickness; 50 µm, trade name TGP-005F) were used instead of the cellulose-containing separators.

Example 1-7

A secondary battery was made in the same manner as Example 1-2 except that $CH_3CH_2O(CF_2)_4F$ (ETHYL NONAFLUOROBUTYL ETHER) (FE2) was used instead of the FE1.

Example 1-8

A secondary battery was made in the same manner as Example 1-2 except that $H(CF_2)_4CH_2O(CF_2)_2H$ (1H,1H,5H-Perfluoropentyl-1,1,2,2-tetrafluoroethyl ether) (FE3) was used instead of the FE1.

Example 1-9

A secondary battery was made in the same manner as Example 1-2 except that $CF_3CHFCF_2OCH_2(CF_2)_2F$ (1H,1H,2'H-PERFLUORODIPROPYL ETHER) (FE4) was used instead of the FE1.

Example 1-10

EC, DMC, and FE1 were mixed at EC/DMC/FE1=4/1/5 (volume ratio) to prepare a mixed solvent. $LiPF_6$ was dissolved in this mixed solvent at a concentration of 1 M to prepare an electrolytic solution (EC:DMC:FE1=4:1:5). A secondary battery was made in the same manner as Example 1-2 except that this obtained electrolytic solution (EC:DMC:FE1=4:1:5) was used.

Example 1-11

EC, DMC, and FE1 were mixed at EC/DMC/FE1=3/1/6 (volume ratio) to prepare a mixed solvent. $LiPF_6$ was dissolved in this mixed solvent at a concentration of 1 M to prepare an electrolytic solution (EC:DMC:FE1=3:1:6). A secondary battery was made in the same manner as Example 1-2 except that this obtained electrolytic solution (EC:DMC:FE1=3:1:6) was used.

Example 1-12

Ethylene carbonate (EC), sulfolane (SL), and a fluorinated ether represented by $H(CF_2)_2CH_2O(CF_2)_2H$ (FE1) were mixed at EC/SL/FE1=3/2/5 (volume ratio) to prepare a mixed solvent. $LiPF_6$ was dissolved in this mixed solvent at a concentration of 1 M to prepare an electrolytic solution (EC:SL:FE1=3:2:5). A secondary battery was made in the same manner as Example 1-2 except that this obtained electrolytic solution (EC:SL:FE1=3:2:5) was used.

Example 1-13

A secondary battery was made in the same manner as Example 1-12 except that cellulose nonwoven fabrics comprising polyethylene (nonwoven fabrics: porosity 55%, thickness; 40 μm) were used as the cellulose-containing separators.

Example 1-14

A secondary battery was made in the same manner as Example 1-12 except that glass fiber-containing separators (manufactured by Nippon Sheet Glass Co., Ltd., nonwoven fabrics: porosity 90%, thickness; 50 μm, trade name TGP-005F) were used instead of the cellulose-containing separators.

Example 1-15

EC, SL, and FE1 were mixed at EC/SL/FE1=1/4/5 (volume ratio) to prepare a mixed solvent. $LiPF_6$ was dissolved in this mixed solvent at a concentration of 1 M to prepare an electrolytic solution (EC:SL:FE1=1:4:5). A secondary battery was made in the same manner as Example 1-2 except that this obtained electrolytic solution (EC:SL:FE1=1:4:5) was used.

Example 1-16

Ethylene carbonate (EC), propione carbonate (PC), sulfolane (SL), and a fluorinated ether represented by $H(CF_2)_2CH_2O(CF_2)_2H$ (FE1) were mixed at EC/PC/SL/FE1=1/1/2/6 (volume ratio) to prepare a mixed solvent. $LiPF_6$ was dissolved in this mixed solvent at a concentration of 1 M to prepare an electrolytic solution (EC/PC/SL/FE1=1/1/2/6). A secondary battery was made in the same manner as Example 1-2 except that this obtained electrolytic solution (EC/PC/SL/FE1=1/1/2/6) was used.

Example 1-17

Ethylene carbonate (EC), dimethyl sulfone (DMS), and a fluorinated ether represented by $H(CF_2)_2CH_2O(CF_2)_2H$ (FE1) were mixed at EC/DMS/FE1=3/2/5 (volume ratio) to prepare a mixed solvent. $LiPF_6$ was dissolved in this mixed solvent at a concentration of 1 M to prepare an electrolytic solution (EC:DMS:FE1=3:2:5). A secondary battery was made in the same manner as Example 1-2 except that this obtained electrolytic solution (EC:DMS:FE1=3:2:5) was used.

Example 1-18

SL and FE1 were mixed at SL/FE1=5/5 (volume ratio) to prepare a mixed solvent. $LiPF_6$ was dissolved in this mixed solvent at a concentration of 1 M to prepare an electrolytic solution (SL:FE1=5:5). A secondary battery was made in the same manner as Example 1-2 except that this obtained electrolytic solution (SL:FE1=5:5) was used.

Comparative Example 1-1

A secondary battery was made in the same manner as Example 1-1 except that polyethylene separators (porosity 38%, film thickness; 25 μm) were used instead of the cellulose-containing separators.

Comparative Example 1-2

A secondary battery was made in the same manner as Example 1-1 except that polyethylene separators (manufactured by Nippon Sheet Glass Co., Ltd., porosity 80%, film thickness; 25 μm) were used instead of the cellulose-containing separators.

Comparative Example 1-3

A secondary battery was made in the same manner as Example 1-1 except that polypropylene separators (manufactured by Asahi Kasei Chemicals Corporation, porosity 55%, film thickness; 25 μm) were used instead of the cellulose-containing separators.

Comparative Example 1-4

A secondary battery was made in the same manner as Example 1-1 except that polypropylene separators (manufactured by Asahi Kasei Chemicals Corporation, porosity 55%, film thickness; 25 μm) were used instead of the cellulose-containing separators, and an electrolytic solution (EC:DMC:FE1=4:2:4) was used as the electrolytic solution.

Comparative Example 1-5

Ethylene carbonate (EC) and dimethyl carbonate (DMC) were mixed at EC:DMC=4:6 (volume ratio) to prepare a mixed solvent. $LiPF_6$ was dissolved in this mixed solvent at a concentration of 1 M to prepare an electrolytic solution (EC:DMC=4:6).

A secondary battery was made in the same manner as Example 1-1 except that this obtained electrolytic solution (EC:DMC=4:6) was used, and polyethylene separators (manufactured by Nippon Sheet Glass Co., Ltd., porosity 38%, film thickness; 25 µm) were used instead of the cellulose-containing separators.

Comparative Example 1-6

A secondary battery was made in the same manner as Example 1-1 except that the above electrolytic solution (EC:DMC=4:6) was used, and polypropylene separators (manufactured by Asahi Kasei Chemicals Corporation, porosity 55%, film thickness; 25 µm) were used instead of the cellulose-containing separators.

Comparative Example 1-7

A secondary battery was made in the same manner as Example 1-2 except that the above electrolytic solution (EC:DMC=4:6) was used.

Comparative Example 1-8

A secondary battery was made in the same manner as Example 1-3 except that the above electrolytic solution (EC:DMC=4:6) was used.

Comparative Example 1-9

A secondary battery was made in the same manner as Example 1-4 except that the above electrolytic solution (EC:DMC=4:6) was used.

Comparative Example 1-10

A secondary battery was made in the same manner as Example 1-12 except that polyethylene separators (porosity 38%, film thickness; 25 µm) were used instead of the cellulose-containing separators.

Comparative Example 1-11

A secondary battery was made in the same manner as Example 1-12 except that polypropylene separators (manufactured by Asahi Kasei Chemicals Corporation, porosity 55%, film thickness; 25 µm) were used instead of the cellulose-containing separators.

Comparative Example 1-12

A secondary battery was made in the same manner as Example 1-18 except that polypropylene separators (manufactured by Asahi Kasei Chemicals Corporation, porosity 55%, film thickness; 25 µm) were used instead of the cellulose-containing separators.

(High Temperature Cycle Test)

For the secondary batteries made in Examples 1-1 to 1-18 and Comparative Examples 1-1 to 1-12, cycle characteristics at high temperature were evaluated.

In the evaluation of cycle characteristics, a cycle in which the secondary battery was charged at 1 C to 4.8 V, then subjected to constant voltage charge for 2.5 hours in total, and then subjected to constant current discharge at 1 C to 3.0 V was repeated 300 times at 45° C. The proportion (%) of discharge capacity after 300 cycles to initial discharge capacity was determined as a capacity retention rate.

In addition, for Examples 1-1 to 1-6 and Comparative Examples 1-1 to 1-4, cycle characteristics were also evaluated at 55° C.

(Gas Generation Evaluation)

The amount of generated gas was evaluated by measuring a change in cell volume after charge and discharge cycles (45° C., 100 cycles). The cell volume was measured using the Archimedes' method, and the difference between before and after the charge and discharge cycles was examined to calculate the amount of generated gas.

The results are shown in Table 1.

As shown in Table 1, it was found that by using an electrolytic solution comprising a fluorinated ether with cellulose-containing separators or glass fiber-containing separators, the capacity retention rate of the secondary battery was improved and gas generation was also effectively suppressed even when 5 V class positive electrodes were used.

TABLE 1

| | Mixed solvent Composition | Separator Component | Porosity (%) | Thickness (µm) | Capacity retention rate after 300 cycles at 45° C. (%) | Capacity retention rate after 300 cycles at 55° C. (%) | Amount of gas generated after 100 cycles at 45° C. (cc) |
|---|---|---|---|---|---|---|---|
| Example 1-1 | EC/DMC/FE1 = 4/4/2 | Cellulose | 60 | 40 | 66 | 59 | 0.44 |
| Example 1-2 | EC/DMC/FE1 = 4/4/2 | Cellulose | 80 | 40 | 65 | 60 | 0.39 |
| Example 1-3 | EC/DMC/FE1 = 4/4/2 | Cellulose + PP | 55 | 40 | 67 | 57 | 0.42 |
| Example 1-4 | EC/DMC/FE1 = 4/4/2 | Glass fibers | 90 | 50 | 65 | 55 | 0.40 |
| Example 1-5 | EC/DMC/FE1 = 4/2/4 | Cellulose | 60 | 40 | 65 | 62 | 0.21 |
| Example 1-6 | EC/DMC/FE1 = 4/2/4 | Glass fibers | 90 | 50 | 67 | 60 | 0.25 |
| Example 1-7 | EC/DMC/FE2 = 4/4/2 | Cellulose | 80 | 40 | 65 | — | 0.46 |
| Example 1-8 | EC/DMC/FE3 = 4/4/2 | Cellulose | 80 | 40 | 61 | — | 0.48 |
| Example 1-9 | EC/DMC/FE4 = 4/4/2 | Cellulose | 80 | 40 | 62 | — | 0.43 |
| Example 1-10 | EC/DMC/FE1 = 4/1/5 | Cellulose | 80 | 40 | 66 | 62 | 0.19 |
| Example 1-11 | EC/DMC/FE1 = 3/1/6 | Cellulose | 80 | 40 | 63 | 60 | 0.15 |
| Example 1-12 | EC/SL/FE1 = 3/2/5 | Cellulose | 80 | 40 | 67 | — | 0.18 |
| Example 1-13 | EC/SL/FE1 = 3/2/5 | Cellulose + PP | 55 | 40 | 67 | — | 0.17 |
| Example 1-14 | EC/SL/FE1 = 3/2/5 | Glass fibers | 90 | 50 | 68 | — | 0.20 |
| Example 1-15 | EC/SL/FE1 = 1/4/5 | Cellulose | 80 | 40 | 65 | — | 0.16 |
| Example 1-16 | EC/PC/SL/FE1 = 1/1/2/6 | Cellulose | 80 | 40 | 64 | — | 0.13 |
| Example 1-17 | EC/DMS/FE1 = 3/2/5 | Cellulose | 80 | 40 | 70 | — | 0.25 |
| Example 1-18 | SL/FE1 = 5/5 | Cellulose | 80 | 40 | 58 | — | 0.19 |
| Comparative Example 1-1 | EC/DMC/FE1 = 4/4/2 | PE | 38 | 25 | 48 | 18 | 0.58 |
| Comparative Example 1-2 | EC/DMC/FE1 = 4/4/2 | PE | 80 | 25 | 50 | 40 | 0.54 |
| Comparative Example 1-3 | EC/DMC/FE1 = 4/4/2 | PP | 55 | 25 | 53 | 45 | 0.57 |
| Comparative Example 1-4 | EC/DMC/FE1 = 4/2/4 | PP | 55 | 25 | 50 | 43 | 0.38 |

TABLE 1-continued

|  | Mixed solvent Composition | Separator Component | Porosity (%) | Thickness (μm) | Capacity retention rate after 300 cycles at 45° C. (%) | Capacity retention rate after 300 cycles at 55° C. (%) | Amount of gas generated after 100 cycles at 45° C. (cc) |
|---|---|---|---|---|---|---|---|
| Comparative Example 1-5 | EC/DMC = 4/6 | PE | 38 | 25 | 48 | — | 1.02 |
| Comparative Example 1-6 | EC/DMC = 4/6 | PP | 55 | 25 | 52 | — | 0.98 |
| Comparative Example 1-7 | EC/DMC = 4/6 | Cellulose | 80 | 40 | 55 | — | 0.91 |
| Comparative Example 1-8 | EC/DMC = 4/6 | Cellulose + PP | 55 | 40 | 54 | — | 0.96 |
| Comparative Example 1-9 | EC/DMC = 4/6 | Glass fibers | 90 | 50 | 54 | — | 0.97 |
| Comparative Example 1-10 | EC/SL/FE1 = 3/2/5 | PE | 38 | 25 | 51 | — | 0.41 |
| Comparative Example 1-11 | EC/SL/FE1 = 3/2/5 | PP | 55 | 25 | 54 | — | 0.37 |
| Comparative Example 1-12 | SL/FE1 = 5/5 | PP | 55 | 25 | 37 | — | 0.35 |

\* EC; ethylene carbonate
DMC; dimethyl carbonate
FE1; $H(CF_2)_2CH_2O(CF_2)_2H$
FE2; ethyl nonafluorobutyl ether
FE3; 1H,1H,5H-perfluoropentyl-1,1,2,2-tetrafluoroethyl ether
FE4; 1H,1H,2'H-perfluorodipropyl ether
PE; polyethylene
PP; polypropylene

Example 2-1

A secondary battery was made in the same manner as Example 1-2 except that tris(2,2,2-trifluoroethyl)phosphate (TTFP) was used instead of the FE1.

Example 2-2

A secondary battery was made in the same manner as Example 2-1 except that cellulose nonwoven fabrics comprising polyethylene (nonwoven fabrics: porosity 55%, thickness; 40 μm) were used as the cellulose-containing separators.

Example 2-3

A secondary battery was made in the same manner as Example 2-1 except that glass fiber-containing separators (manufactured by Nippon Sheet Glass Co., Ltd., nonwoven fabrics: porosity 90%, thickness; 50 μm, trade name TGP-005F) were used instead of the cellulose-containing separators.

Example 2-4

A secondary battery was made in the same manner as Example 2-1 except that tris(1H,1H-heptafluorobutyl)phosphate (FP) was used instead of the TTFP.

Tris(1H,1H-heptafluorobutyl)phosphate (FP)

Example 2-5

EC, DMC, and TTFP were mixed at EC/DMC/TTFP=4/1/5 (volume ratio) to prepare a mixed solvent. LiPF$_6$ was dissolved in this mixed solvent at a concentration of 1 M to prepare an electrolytic solution (EC:DMC:TTFP=4:1:5). A secondary battery was made in the same manner as Example 2-1 except that this obtained electrolytic solution (EC:DMC:TTFP=4:1:5) was used.

Example 2-6

EC and TTFP were mixed at EC/TTFP=4/6 (volume ratio) to prepare a mixed solvent. LiPF$_6$ was dissolved in this mixed solvent at a concentration of 1 M to prepare an electrolytic solution (EC:TTFP=4:6). A secondary battery was made in the same manner as Example 2-1 except that this obtained electrolytic solution (EC:TTFP=4:6) was used.

Comparative Example 2-1

A secondary battery was made in the same manner as Example 2-1 except that polyethylene separators (porosity 38%, film thickness; 25 μm) were used instead of the cellulose-containing separators.

Comparative Example 2-2

A secondary battery was made in the same manner as Example 2-1 except that polypropylene separators (manufactured by Asahi Kasei Chemicals Corporation, porosity 55%, film thickness; 25 μm) were used instead of the cellulose-containing separators.

(High Temperature Cycle Test)

For the secondary batteries made in Examples 2-1 to 2-4 and Comparative Examples 2-1 to 2-2, cycle characteristics at high temperature were evaluated. The results are shown in Table 2.

In the evaluation of cycle characteristics, a cycle in which the secondary battery was charged at 1 C to 4.8 V, then subjected to constant voltage charge for 2.5 hours in total, and then subjected to constant current discharge at 1 C to 3.0 V was repeated 300 times at 45° C. The proportion (%) of discharge capacity after 300 cycles to initial discharge capacity was determined as a capacity retention rate.

(Gas Generation Evaluation)

The amount of generated gas was evaluated by measuring a change in cell volume after charge and discharge cycles (45° C., 100 cycles). The cell volume was measured using the Archimedes' method, and the difference between before and after the charge and discharge cycles was examined to calculate the amount of generated gas.

As shown in Table 2, it was found that by using an electrolytic solution comprising a fluorinated phosphate with cellulose-containing separators or glass fiber-containing separators, the capacity retention rate of the secondary battery was improved and gas generation was also effectively suppressed even when 5 V class positive electrodes were used.

(EC:DMC:TFMP=4:4:2). A secondary battery was made in the same manner as Example 1-2 except that this obtained electrolytic solution (EC:DMC:TFMP=4:4:2) was used.

Example 3-2

A secondary battery was made in the same manner as Example 3-1 except that cellulose nonwoven fabrics comprising polyethylene (nonwoven fabrics: porosity 55%, thickness; 40 μm) were used as the cellulose-containing separators.

Example 3-3

A secondary battery was made in the same manner as Example 3-1 except that glass fiber-containing separators (manufactured by Nippon Sheet Glass Co., Ltd., nonwoven fabrics: porosity 90%, thickness; 50 μm, trade name TGP-005F) were used instead of the cellulose-containing separators.

Example 3-4

Methyl 2,2,3,3-tetrafluoropropionate (TFMP) and propylene carbonate (PC) were mixed at PC/TFMP=5/5 (volume ratio) to prepare a mixed solvent. $LiPF_6$ was dissolved in this mixed solvent at a concentration of 1 M to prepare an electrolytic solution (PC:TFMP=5:5). A secondary battery was made in the same manner as Example 3-1 except that this obtained electrolytic solution (PC:TFMP=5:5) was used.

Example 3-5

A secondary battery was made in the same manner as Example 3-1 except that methyl 2,3,3,3-tetrafluoropropionate (FCE) was used instead of the TFMP.

Example 3-6

Ethylene carbonate (EC), sulfolane (SL), and methyl 2,2,3,3-tetrafluoropropionate (TFMP) were mixed at EC/SL/TFMP=3/2/5 (volume ratio) to prepare a mixed solvent. $LiPF_6$ was dissolved in this mixed solvent at a concentration of 1 M to prepare an electrolytic solution (EC:SL:TFMP=3:2:5). A secondary battery was made in the same manner as Example 3-1 except that this obtained electrolytic solution (EC:SL:TFMP=3:2:5) was used.

TABLE 2

| | Mixed solvent Composition | Separator Component | Porosity (%) | Thickness (μm) | Capacity retention rate after 300 cycles at 45° C. (%) | Amount of gas generated after 100 cycles at 45° C. (cc) |
|---|---|---|---|---|---|---|
| Example 2-1 | EC/DMC/TTFP = 4/4/2 | Cellulose | 80 | 40 | 64 | 0.45 |
| Example 2-2 | EC/DMC/TTFP = 4/4/2 | Cellulose + PP | 55 | 40 | 63 | 0.48 |
| Example 2-3 | EC/DMC/TTFP = 4/4/2 | Glass fibers | 90 | 50 | 64 | 0.51 |
| Example 2-4 | EC/DMC/FP = 4/4/2 | Cellulose | 80 | 40 | 62 | 0.53 |
| Example 2-5 | EC/DMC/TTFP = 4/1/5 | Cellulose | 80 | 40 | 63 | 0.29 |
| Example 2-6 | EC/TTFP = 4/6 | Cellulose | 80 | 40 | 63 | 0.18 |
| Comparative Example 2-1 | EC/DMC/TTFP = 4/4/2 | PE | 38 | 25 | 49 | 0.72 |
| Comparative Example 2-2 | EC/DMC/TTFP = 4/4/2 | PP | 55 | 25 | 52 | 0.66 |

* TTFP; tris(2,2,2-trifluoroethyl)phosphate
FP; tris(1H,1H-heptafluorobutyl) phosphate

Example 3-1

Methyl 2,2,3,3-tetrafluoropropionate (TFMP), ethylene carbonate (EC), and dimethyl carbonate (DMC) were mixed at EC/DMC/TFMP=4/4/2 (volume ratio) to prepare a mixed solvent. $LiPF_6$ was dissolved in this mixed solvent at a concentration of 1 M to prepare an electrolytic solution Comparative Example 3-1

A secondary battery was made in the same manner as Example 3-1 except that polyethylene separators (porosity 38%, film thickness; 25 μm) were used instead of the cellulose-containing separators.

Comparative Example 3-2

A secondary battery was made in the same manner as Example 3-1 except that polypropylene separators (manufactured by Asahi Kasei Chemicals Corporation, porosity 55%, film thickness; 25 μm) were used instead of the cellulose-containing separators.

Comparative Example 3-3

A secondary battery was made in the same manner as Example 3-4 except that polyethylene separators (porosity 38%, film thickness; 25 μm) were used instead of the cellulose-containing separators.

Comparative Example 3-4

A secondary battery was made in the same manner as Example 3-4 except that polypropylene separators (manufactured by Asahi Kasei Chemicals Corporation, porosity 55%, film thickness; 25 μm) were used instead of the cellulose-containing separators.

Comparative Example 3-5

A secondary battery was made in the same manner as Example 3-6 except that polypropylene separators (manufactured by Asahi Kasei Chemicals Corporation, porosity 55%, film thickness; 25 μm) were used instead of the cellulose-containing separators.

(High Temperature Cycle Test)

For the secondary batteries made in Examples 3-1 to 3-4 and Comparative Examples 3-1 to 3-2, cycle characteristics at high temperature were evaluated. The results are shown in Table 3.

In the evaluation of cycle characteristics, a cycle in which the secondary battery was charged at 1 C to 4.8 V, then subjected to constant voltage charge for 2.5 hours in total, and then subjected to constant current discharge at 1 C to 3.0 V was repeated 300 times at 45° C. The proportion (%) of discharge capacity after 300 cycles to initial discharge capacity was determined as a capacity retention rate.

(Gas Generation Evaluation)

The amount of generated gas was evaluated by measuring a change in cell volume after charge and discharge cycles (45° C., 100 cycles). The cell volume was measured using the Archimedes' method, and the difference between before and after the charge and discharge cycles was examined to calculate the amount of generated gas.

As shown in Table 3, it was found that by using an electrolytic solution comprising a fluorinated carboxylate with cellulose-containing separators or glass fiber-containing separators, the capacity retention rate of the secondary battery was improved and gas generation was also effectively suppressed even when 5 V class positive electrodes were used.

TABLE 3

| | Mixed solvent Composition | Separator Component | Porosity (%) | Thickness (μm) | Capacity retention rate after 300 cycles at 45° C. (%) | Amount of gas generated after 100 cycles at 45° C. (cc) |
|---|---|---|---|---|---|---|
| Example 3-1 | EC/DMC/TFMP = 4/4/2 | Cellulose | 80 | 40 | 62 | 0.61 |
| Example 3-2 | EC/DMC/TFMP = 4/4/2 | Cellulose + PP | 55 | 40 | 60 | 0.62 |
| Example 3-3 | EC/DMC/TFMP = 4/4/2 | Glass fibers | 90 | 50 | 58 | 0.60 |
| Example 3-4 | PC/TFMP = 5/5 | Cellulose | 80 | 40 | 67 | 0.83 |
| Example 3-5 | EC/DMC/FCE = 4/4/2 | Cellulose | 80 | 40 | 59 | 0.64 |
| Example 3-6 | EC/SL/TFMP = 3/2/5 | Cellulose | 80 | 40 | 62 | 0.29 |
| Comparative Example 3-1 | EC/DMC/TFMP = 4/4/2 | PE | 38 | 25 | 54 | 0.85 |
| Comparative Example 3-2 | EC/DMC/TFMP = 4/4/2 | PP | 55 | 25 | 56 | 0.79 |
| Comparative Example 3-3 | PC/TFMP = 5/5 | PE | 38 | 25 | 60 | 1.32 |
| Comparative Example 3-4 | PC/TFMP = 5/5 | PP | 55 | 25 | 61 | 1.18 |
| Comparative Example 3-5 | EC/SL/TFMP = 3/2/5 | PP | 55 | 25 | 50 | 0.54 |

\* TFMP; methyl 2,2,3,3-tetrafluoropropionate
FCE; methyl 2,3,3,3-tetrafluoropropionate
PC; propylene carbonate Example 4-1

A secondary battery was made in the same manner as Example 1-2 except that 2,2,2trifluoroethyl methyl carbonate (FEMC) was used instead of the FE1.

Example 4-2

A secondary battery was made in the same manner as Example 4-1 except that cellulose nonwoven fabrics comprising polyethylene (nonwoven fabrics: porosity 55%, thickness; 40 µm) were used as the cellulose-containing separators.

Example 4-3

A secondary battery was made in the same manner as Example 4-1 except that glass fiber-containing separators (manufactured by Nippon Sheet Glass Co., Ltd., nonwoven fabrics: porosity 90%, thickness; 50 µm, trade name TGP-005F) were used instead of the cellulose-containing separators.

Example 4-4

A secondary battery was made in the same manner as Example 4-1 except that 2,2,2trifluoroethyl, ethyl carbonate (FC) was used instead of the FEMC.

Comparative Example 4-1

A secondary battery was made in the same manner as Example 4-1 except that polyethylene separators (porosity 38%, film thickness; 25 µm) were used instead of the cellulose-containing separators.

Comparative Example 4-2

A secondary battery was made in the same manner as Example 4-1 except that polypropylene separators (manufactured by Asahi Kasei Chemicals Corporation, porosity 55%, film thickness; 25 µm) were used instead of the cellulose-containing separators.

(High Temperature Cycle Test)

For the secondary batteries made in Examples 4-1 to 4-4 and Comparative Examples 4-1 to 4-2, cycle characteristics at high temperature were evaluated. The results are shown in Table 4.

In the evaluation of cycle characteristics, a cycle in which the secondary battery was charged at 1 C to 4.8 V, then subjected to constant voltage charge for 2.5 hours in total, and then subjected to constant current discharge at 1 C to 3.0 V was repeated 300 times at 45° C. The proportion (%) of discharge capacity after 300 cycles to initial discharge capacity was determined as a capacity retention rate.

(Gas Generation Evaluation)

The amount of generated gas was evaluated by measuring a change in cell volume after charge and discharge cycles (45° C., 100 cycles). The cell volume was measured using the Archimedes' method, and the difference between before and after the charge and discharge cycles was examined to calculate the amount of generated gas.

As shown in Table 4, it was found that by using an electrolytic solution comprising a fluorinated carbonate with cellulose-containing separators or glass fiber-containing separators, the capacity retention rate of the secondary battery was improved and gas generation was also effectively suppressed even when 5 V class positive electrodes were used.

TABLE 4

| | Mixed solvent Composition | Separator Component | Porosity (%) | Thickness (µm) | Capacity retention rate after 300 cycles at 45° C. (%) | Amount of gas generated after 100 cycles at 45° C. (cc) |
|---|---|---|---|---|---|---|
| Example 4-1 | EC/DMC/FEMC = 4/4/2 | Cellulose | 80 | 40 | 60 | 0.58 |
| Example 4-2 | EC/DMC/FEMC = 4/4/2 | Cellulose + PP | 55 | 40 | 61 | 0.60 |
| Example 4-3 | EC/DMC/FEMC = 4/4/2 | Glass fibers | 90 | 50 | 62 | 0.57 |
| Example 4-4 | EC/DMC/FC = 4/4/2 | Cellulose | 80 | 40 | 60 | 0.54 |
| Comparative Example 4-1 | EC/DMC/FEMC = 4/4/2 | PE | 38 | 25 | 48 | 0.78 |
| Comparative Example 4-2 | EC/DMC/FEMC = 4/4/2 | PP | 55 | 25 | 52 | 0.75 |

* FEMC; 2,2,2trifluoroethyl methyl carbonate
FC; 2,2,2trifluoroethyl, ethyl carbonate Examples 5-1 to 5-14

A secondary battery was made in the same manner as Example 1-2 except that a lithium-containing complex oxide (5 V class active material) shown in Table 5 was used as the positive electrode active material.

Comparative Example 5-1

A secondary battery was made in the same manner as Example 5-13 except that polyethylene separators (porosity 38%, film thickness; 25 µm) were used instead of the cellulose-containing separators.

Comparative Example 5-2

A secondary battery was made in the same manner as Example 5-14 except that polyethylene separators (porosity 38%, film thickness; 25 µm) were used instead of the cellulose-containing separators.

Comparative Example 5-3

A secondary battery was made in the same manner as Example 5-10 except that polyethylene separators (porosity 38%, film thickness; 25 µm) were used instead of the cellulose-containing separators.

(Gas Generation Evaluation)

The amount of generated gas was evaluated by measuring a change in cell volume after charge and discharge cycles (45° C., 100 cycles). The cell volume was measured using the Archimedes' method, and the difference between before and after the charge and discharge cycles was examined to calculate the amount of generated gas.

As shown in Table 5, even if the type of the 5 V class active material was changed, good cycle characteristics were obtained.

TABLE 5

|  | Positive electrode | | Separator | | | Capacity retention |
| --- | --- | --- | --- | --- | --- | --- |
|  | active material Composition | Mixed solvent Composition | Component | Porosity (%) | Thickness (µm) | rate after 300 cycles at 45° C. (%) |
| Example 1-2 | LiNi0.5Mn1.37Ti0.13O4 | EC/DMC/FE1 = 4/4/2 | Cellulose | 80 | 40 | 65 |
| Example 5-1 | LiNi0.5Mn1.48Ti0.02O4 | EC/DMC/FE1 = 4/4/2 | Cellulose | 80 | 40 | 64 |
| Example 5-2 | LiNi0.5Mn1.45Si0.05O4 | EC/DMC/FE1 = 4/4/2 | Cellulose | 80 | 40 | 64 |
| Example 5-3 | LiNi0.5Mn1.45Mg0.05O4 | EC/DMC/FE1 = 4/4/2 | Cellulose | 80 | 40 | 65 |
| Example 5-4 | LiNi0.5Mn1.45Na0.05O4 | EC/DMC/FE1 = 4/4/2 | Cellulose | 80 | 40 | 63 |
| Example 5-5 | LiNi0.5Mn1.45Li0.05O4 | EC/DMC/FE1 = 4/4/2 | Cellulose | 80 | 40 | 62 |
| Example 5-6 | LiNi0.5Mn1.45B0.05O4 | EC/DMC/FE1 = 4/4/2 | Cellulose | 80 | 40 | 61 |
| Example 5-7 | LiNi0.5Mn1.45A10.05O3.95F0.05 | EC/DMC/FE1 = 4/4/2 | Cellulose | 80 | 40 | 65 |
| Example 5-8 | LiNi0.5Mn1.5O4 | EC/DMC/FE1 = 4/4/2 | Cellulose | 80 | 40 | 60 |
| Example 5-9 | LiNi0.25Fe0.25Mn1.5O4 | EC/DMC/FE1 = 4/4/2 | Cellulose | 80 | 40 | 58 |
| Example 5-10 | LiNi0.25Cr0.25Mn1.5O4 | EC/DMC/FE1 = 4/4/2 | Cellulose | 80 | 40 | 56 |
| Example 5-11 | LiFe0.5Mn1.5O4 | EC/DMC/FE1 = 4/4/2 | Cellulose | 80 | 40 | 50 |
| Example 5-12 | LiFe0.5Mn1.45Na0.05O3.95F0.15 | EC/DMC/FE1 = 4/4/2 | Cellulose | 80 | 40 | 54 |
| Example 5-13 | LiCoPO4 | EC/DMC/FE1 = 4/4/2 | Cellulose | 80 | 40 | 53 |
| Example 5-14 | Li(Li0.15Ni.0.2Mn0.65)O2 | EC/DMC/FE1 = 4/4/2 | Cellulose | 80 | 40 | 56 |
| Comparative Example 5-1 | LiCoPO4 | EC/DMC/FE1 = 4/4/2 | PE | 38 | 25 | 41 |
| Comparative Example 5-2 | Li(Li0.15Ni.0.2Mn0.65)O2 | EC/DMC/FE1 = 4/4/2 | PE | 38 | 25 | 42 |
| Comparative Example 5-3 | LiNi0.25Cr0.25Mn1.5O4 | EC/DMC/FE1 = 4/4/2 | PE | 38 | 25 | 44 |
| Comparative Example 5-4 | LiFe0.5Mn1.5O4 | EC/DMC/FE1 = 4/4/2 | PE | 38 | 25 | 36 |
| Comparative Example 5-5 | LiFe0.5Mn1.45Na0.05O3.95F0.15 | EC/DMC/FE1 = 4/4/2 | PE | 38 | 25 | 38 |

Comparative Example 5-4

A secondary battery was made in the same manner as Example 5-11 except that polyethylene separators (porosity 38%, film thickness; 25 µm) were used instead of the cellulose-containing separators.

Comparative Example 5-5

A secondary battery was made in the same manner as Example 5-14 except that polyethylene separators (porosity 38%, film thickness; 25 µm) were used instead of the cellulose-containing separators.

(High Temperature Cycle Test)

For the secondary batteries made in Examples 5-1 to 5-14 and Comparative Examples 5-1 to 5-2, cycle characteristics at high temperature were evaluated. The results are shown in Table 5.

In the evaluation of cycle characteristics, a cycle in which the secondary battery was charged at 1 C to 4.8 V, then subjected to constant voltage charge for 2.5 hours in total, and then subjected to constant current discharge at 1 C to 3.0 V was repeated 300 times at 45° C. The proportion (%) of discharge capacity after 300 cycles to initial discharge capacity was determined as a capacity retention rate.

Reference Example 1-1

A secondary battery was made in the same manner as Example 1-2 except that LiMn₂O₄ was used as the positive electrode active material.

Reference Example 1-2

A secondary battery was made in the same manner as Reference Example 1-1 except that polyethylene separators (porosity 38%, film thickness; 25 µm) were used instead of the cellulose-containing separators.

Reference Example 1-3

A secondary battery was made in the same manner as Reference Example 1-1 except that polypropylene separators (manufactured by Asahi Kasei Chemicals Corporation, porosity 55%, film thickness; 25 µm) were used instead of the cellulose-containing separators.

Reference Example 1-4

A secondary battery was made in the same manner as Reference Example 1-1 except that glass fiber-containing separators (manufactured by Nippon Sheet Glass Co., Ltd., nonwoven fabrics: porosity 90%, thickness; 50 μm, trade name TGP-005F) were used instead of the cellulose-containing separators.

Reference Example 2-1

A secondary battery was made in the same manner as Reference Example 1-1 except that the above electrolytic solution (EC:DMC=4:6) was used.

Reference Example 2-2

A secondary battery was made in the same manner as Reference Example 1-2 except that the above electrolytic solution (EC:DMC=4:6) was used.

Reference Example 2-3

A secondary battery was made in the same manner as Reference Example 1-3 except that the above electrolytic solution (EC:DMC=4:6) was used.

Reference Example 2-4

A secondary battery was made in the same manner as Reference Example 1-4 except that the above electrolytic solution (EC:DMC=4:6) was used.

(High Temperature Cycle Test)

For the secondary batteries made in Reference Examples 1-1 to 1-4 and Reference Example 2-1 to 2-4, cycle characteristics at high temperature were evaluated. The results are shown in Table 6.

Example 6-2

EC, FE1, and TTFP were mixed at EC/FE1/TTFP=1/4/5 (volume ratio) to prepare a mixed solvent. $LiPF_6$ was dissolved in this mixed solvent at a concentration of 1 M to prepare an electrolytic solution (EC/FE1/TTFP=1/4/5). A secondary battery was made in the same manner as Example 1-2 except that this obtained electrolytic solution (EC/FE1/TTFP=1/4/5) was used.

Example 6-3

EC, DMC, FE1, and TTFP were mixed at EC/DMC/FE1/TTFP=2/1/4/3 (volume ratio) to prepare a mixed solvent. $LiPF_6$ was dissolved in this mixed solvent at a concentration of 1 M to prepare an electrolytic solution (EC/DMC/FE1/TTFP=2/1/4/3). A secondary battery was made in the same manner as Example 6-1 except that this obtained electrolytic solution (EC/DMC/FE1/TTFP=2/1/4/3) was used.

Example 6-4

EC, PC, FE1, and TTFP were mixed at EC/PC/FE1/TTFP=2/1/4/3 (volume ratio) to prepare a mixed solvent. $LiPF_6$ was dissolved in this mixed solvent at a concentration of 1 M to prepare an electrolytic solution (EC/PC/FE1/TTFP=2/1/4/3). A secondary battery was made in the same manner as Example 6-1 except that this obtained electrolytic solution (EC/PC/FE1/TTFP=2/1/4/3) was used.

Example 6-5

PC, FE1, and TTFP were mixed at PC/FE1/TTFP=3/4/3 (volume ratio) to prepare a mixed solvent. $LiPF_6$ was dis-

TABLE 6

| | Positive electrode | | Separator | | | Capacity retention rate after 300 |
|---|---|---|---|---|---|---|
| | active material Composition | Mixed solvent Composition | Component | Porosity (%) | Thickness (μm) | cycles at 45° C. (%) |
| Reference Example 1-1 | LiMn2O4 | EC/DMC/FE1 = 4/4/2 | Cellulose | 80 | 40 | 82 |
| Reference Example 1-2 | LiMn2O4 | EC/DMC/FE1 = 4/4/2 | PE | 38 | 25 | 82 |
| Reference Example 1-3 | LiMn2O4 | EC/DMC/FE1 = 4/4/2 | PP | 55 | 25 | 83 |
| Reference Example 1-4 | LiMn2O4 | EC/DMC/FE1 = 4/4/2 | Glass fibers | 90 | 50 | 82 |
| Reference Example 2-1 | LiMn2O4 | EC/DMC = 4/6 | Cellulose | 80 | 40 | 83 |
| Reference Example 2-2 | LiMn2O4 | EC/DMC = 4/6 | PE | 38 | 25 | 84 |
| Reference Example 2-3 | LiMn2O4 | EC/DMC = 4/6 | PP | 55 | 25 | 85 |
| Reference Example 2-4 | LiMn2O4 | EC/DMC = 4/6 | Glass fibers | 90 | 50 | 83 |

Example 6-1

EC, FE1, and TTFP were mixed at EC/FE1/TTFP=4/4/2 (volume ratio) to prepare a mixed solvent. $LiPF_6$ was dissolved in this mixed solvent at a concentration of 1 M to prepare an electrolytic solution (EC/FE1/TTFP=4/4/2). A secondary battery was made in the same manner as Example 1-2 except that this obtained electrolytic solution (EC/FE1/TTFP=4/4/2) was used.

solved in this mixed solvent at a concentration of 1 M to prepare an electrolytic solution (PC/FE1/TTFP=3/4/3). A secondary battery was made in the same manner as Example 6-1 except that this obtained electrolytic solution (PC/FE1/TTFP=3/4/3) was used.

Example 6-6

PC, FE1, and TFMP were mixed at PC/FE1/TFMP=3/4/3 (volume ratio) to prepare a mixed solvent. $LiPF_6$ was dissolved in this mixed solvent at a concentration of 1 M to prepare an electrolytic solution (PC/FE1/TFMP=3/4/3). A secondary battery was made in the same manner as Example 6-1 except that this obtained electrolytic solution (PC/FE1/TFMP=3/4/3) was used.

Example 6-7

EC, FE1, and TFMP were mixed at EC/FE1/TFMP=4/4/2 (volume ratio) to prepare a mixed solvent. $LiPF_6$ was dissolved in this mixed solvent at a concentration of 1 M to prepare an electrolytic solution (EC/FE1/TFMP=4/4/2). A secondary battery was made in the same manner as Example 5-1 except that this obtained electrolytic solution (EC/FE1/TFMP=4/4/2) was used.

Comparative Example 6-1

A secondary battery was made in the same manner as Example 6-1 except that polypropylene separators (manufactured by Asahi Kasei Chemicals Corporation, porosity 55%, film thickness; 25 µm) were used instead of the cellulose-containing separators.

Comparative Example 6-2

A secondary battery was made in the same manner as Example 6-2 except that polypropylene separators (manufactured by Asahi Kasei Chemicals Corporation, porosity 55%, film thickness; 25 µm) were used instead of the cellulose-containing separators.

Comparative Example 6-3

A secondary battery was made in the same manner as Example 6-3 except that polypropylene separators (manufactured by Asahi Kasei Chemicals Corporation, porosity 55%, film thickness; 25 µm) were used instead of the cellulose-containing separators.

Comparative Example 6-4

A secondary battery was made in the same manner as Example 6-4 except that polypropylene separators (manufactured by Asahi Kasei Chemicals Corporation, porosity 55%, film thickness; 25 µm) were used instead of the cellulose-containing separators.

Comparative Example 6-5

A secondary battery was made in the same manner as Example 6-5 except that polypropylene separators (manufactured by Asahi Kasei Chemicals Corporation, porosity 55%, film thickness; 25 µm) were used instead of the cellulose-containing separators.

Comparative Example 6-6

A secondary battery was made in the same manner as Example 6-6 except that polypropylene separators (manufactured by Asahi Kasei Chemicals Corporation, porosity 55%, film thickness; 25 µm) were used instead of the cellulose-containing separators.

Comparative Example 6-7

A secondary battery was made in the same manner as Example 6-7 except that polypropylene separators (manufactured by Asahi Kasei Chemicals Corporation, porosity 55%, film thickness; 25 µm) were used instead of the cellulose-containing separators.

(High Temperature Cycle Test)

For the secondary batteries made in Examples 6-1 to 6-7 and Comparative Examples 6-1 to 6-7, cycle characteristics at high temperature were evaluated. The results are shown in Table 5.

In the evaluation of cycle characteristics, a cycle in which the secondary battery was charged at 1 C to 4.8 V, then subjected to constant voltage charge for 2.5 hours in total, and then subjected to constant current discharge at 1 C to 3.0 V was repeated 300 times at 45° C. The proportion (%) of discharge capacity after 300 cycles to initial discharge capacity was determined as a capacity retention rate.

(Gas Generation Evaluation)

The amount of generated gas was evaluated by measuring a change in cell volume after charge and discharge cycles (45° C., 100 cycles). The cell volume was measured using the Archimedes' method, and the difference between before and after the charge and discharge cycles was examined to calculate the amount of generated gas.

As shown in Table 7, it was found that by using an electrolytic solution comprising two or more fluorinated solvents with cellulose-containing separators or glass fiber-containing separators, the capacity retention rate of the secondary battery was improved and gas generation was also effectively suppressed even when 5 V class positive electrodes were used.

TABLE 7

| | Mixed solvent Composition | Separator | | | Capacity retention rate after 300 cycles at 45° C. (%) | Amount of gas generated after 100 cycles at 45° C. (cc) |
|---|---|---|---|---|---|---|
| | | Component | Porosity (%) | Thickness (µm) | | |
| Example 6-1 | EC/FE1/TTFP = 4/4/2 | Cellulose | 80 | 40 | 59 | 0.31 |
| Example 6-2 | EC/FE1/TTFP = 1/4/5 | Cellulose | 80 | 40 | 54 | 0.10 |
| Example 6-3 | EC/DMC/FE1/TTFP = 2/1/4/3 | Cellulose | 80 | 40 | 64 | 0.41 |
| Example 6-4 | EC/PC/FE1/TTFP = 2/1/4/3 | Cellulose | 80 | 40 | 66 | 0.14 |
| Example 6-5 | PC/FE1/TTFP = 3/4/3 | Cellulose | 80 | 40 | 62 | 0.19 |
| Example 6-6 | PC/FE1/TFMP = 3/4/3 | Cellulose | 80 | 40 | 58 | 0.37 |
| Example 6-7 | EC/FE1/TFMP = 4/4/2 | Cellulose | 80 | 40 | 60 | 0.42 |
| Comparative Example 6-1 | EC/FE1/TTFP = 4/4/2 | PP | 55 | 25 | 51 | 0.44 |
| Comparative Example 6-2 | EC/FE1/TTFP = 1/4/5 | PP | 55 | 25 | 38 | 0.25 |
| Comparative Example 6-3 | EC/DMC/FE1/TTFP = 2/1/4/3 | PP | 55 | 25 | 57 | 0.57 |
| Comparative Example 6-4 | EC/PC/FE1/TTFP = 2/1/4/3 | PP | 55 | 25 | 57 | 0.30 |

TABLE 7-continued

| | Mixed solvent Composition | Separator Component | Porosity (%) | Thickness (μm) | Capacity retention rate after 300 cycles at 45° C. (%) | Amount of gas generated after 100 cycles at 45° C. (cc) |
|---|---|---|---|---|---|---|
| Comparative Example 6-5 | PC/FE1/TTFP = 3/4/3 | PP | 55 | 25 | 54 | 0.33 |
| Comparative Example 6-6 | PC/FE1/TFMP = 3/4/3 | PP | 55 | 25 | 50 | 0.52 |
| Comparative Example 6-7 | EC/FE1/TFMP = 4/4/2 | PP | 55 | 25 | 49 | 0.59 |

This application claims priority to Japanese Patent Application No. 2011-246510 filed on Nov. 10, 2011, the entire disclosure of which is incorporated herein.

The invention of this application has been described with reference to the exemplary embodiment and the Examples, but the invention of this application is not limited to the above exemplary embodiment and Examples. Various changes that can be understood by those skilled in the art can be made in the configuration and details of the invention of this application within the scope of the invention of this application.

REFERENCE SIGNS LIST a negative electrode
b separator
c positive electrode
d negative electrode current collector
e positive electrode current collector
f positive electrode terminal
g negative electrode terminal

The invention claimed is:

1. A lithium ion secondary battery comprising a positive electrode and a negative electrode which are capable of intercalating and deintercalating lithium, a separator between the positive electrode and the negative electrode, and an electrolytic solution containing a nonaqueous electrolytic solvent, wherein
the positive electrode comprises a positive electrode active material operating at a potential of 4.5 V or more versus lithium,
the separator comprises cellulose, or a cellulose derivative,
the nonaqueous electrolytic solvent comprises a fluorinated solvent in an amount ranging from 5 to 80% by volume, wherein said fluorinated solvent comprises a fluorinated ether represented by the following formula (1-1);

$$R_{101}-O-R_{102} \quad (1\text{-}1)$$

wherein $R_{101}$ and $R_{102}$ each independently represent an alkyl group having 1 to 12 carbon atoms or a fluorine-substituted alkyl group having 1 to 6 carbon atoms, and at least one of $R_{101}$ and $R_{102}$ is the fluorine-substituted alkyl group,
the porosity of the separator ranges from at least 50% through 95%, and
the positive electrode active material comprises lithium manganese complex oxide represented by the following formula (A), $$Li_a(M_xMn_{2-x-y}Y_y)(O_{4-w}Z_w) \quad (A)$$

wherein $0.4 \leq x \leq 1.2$, $0 \leq y < 0.3$, $x+y<2$, $0 \leq a \leq 1.2$, and $0 \leq w \leq 1$ are satisfied; M is at least one selected from Co, Ni, Fe, Cr, and Cu; Y is at least one selected from Li, B, Na, Mg, Al, Ti, Si, K, and Ca; and Z is at least one selected from F and Cl.

2. The lithium ion secondary battery according to claim 1, wherein the separator is a cellulose-containing separator.

3. The lithium ion secondary battery according to claim 1, wherein the separator is a cellulose derivative-containing separator.

4. The lithium ion secondary battery according to claim 1, wherein the nonaqueous electrolytic solvent further comprises a carbonate compound in an amount ranging from 10 to 90% by volume.

5. The lithium ion secondary battery according to claim 4, wherein the nonaqueous electrolytic solvent further comprises a carbonate compound,
a content of the fluorinated solvent in the nonaqueous electrolytic solvent is 10 to 50% by volume, and
a content of the carbonate compound in the nonaqueous electrolytic solvent is 50 to 90% by volume.

* * * * *